(12) United States Patent
Molayousefi et al.

(10) Patent No.: US 11,427,766 B2
(45) Date of Patent: Aug. 30, 2022

(54) DETERRING AGGREGATION OF ASPHALTENES BY RESINS

(71) Applicant: Colorado State University Research Foundation, Fort Collins, CO (US)

(72) Inventors: Mortaza Derakhshani Molayousefi, Fort Collins, CO (US); Martin McCullagh, Fort Collins, CO (US)

(73) Assignee: Colorado State University Research Foundation, Fort Collins, CO (US)

(*) Notice: Subject to any disclaimer, the term of this patent is extended or adjusted under 35 U.S.C. 154(b) by 0 days.

(21) Appl. No.: 16/998,613

(22) Filed: Aug. 20, 2020

(65) Prior Publication Data

US 2021/0139792 A1 May 13, 2021

Related U.S. Application Data

(60) Provisional application No. 62/889,546, filed on Aug. 20, 2019.

(51) Int. Cl.
| | | |
|---|---|---|
| *C10G 21/00* | (2006.01) | |
| *C09K 8/524* | (2006.01) | |
| *C10G 21/20* | (2006.01) | |

(52) U.S. Cl.
CPC ............ *C10G 21/003* (2013.01); *C09K 8/524* (2013.01); *C10G 21/20* (2013.01); *C10G 2300/206* (2013.01); *C10G 2300/80* (2013.01)

(58) Field of Classification Search
CPC ....... C10G 21/003; C10G 21/14; C09K 8/524
See application file for complete search history.

(56) References Cited

U.S. PATENT DOCUMENTS

| | | |
|---|---|---|
| 5,494,607 A | 2/1996 | Manek et al. |
| 6,180,683 B1 | 1/2001 | Miller et al. |

OTHER PUBLICATIONS

Spiecker, P. Matthew et al, "Effects of petroleum resins on asphaltene aggregation and water-in-oil emulsion formation", Colloids and Surfaces, 220, pp. 9-27 (Year: 2003).*
Anisimov, M. A. et al, "Effects of Resins on Aggregation and Stability of Asphaltenes", Energy & Fuels, 28, pp. 6200-6209 (Year: 2014).*
Duran, J. A. et al, "Nature of Asphaltene Aggregates", Energy & Fuels, 33, pp. 3694-3710 (Year: 2018).*
Abraham, M.J.; Murtola, T.; Schulz, R.; Pall, S.; Smith, J.C.; Hess, B.; Lindahl, E. GROMACS: high performance molecular simulations through multi-level parallelism from laptops to supercomputers SoftwareX, 2015, 1-2, 19-25.
Adams, J. J. Asphaltene Adsorption, a Literature Review. Energy Fuels 2014, 28, 2831-2856.
Anisimov, M. A.; Ganeeva, Y. M.; Gorodetskii, E. E.; Deshabo, V. A.; Kosov, V. I.; Kuryakov, V. N.; Yudin, D. I.; Yudin, I. K. Effects of Resins on Aggregation and Stability of Asphaltenes. Energy Fuels 2014, 28, 6200-6209.
Bauget, Fabrice, Dominique Langevin, and Roland Lenormand. "Dynamic surface properties of asphaltenes and resins at the oil-air interface." Journal of Colloid and Interface Science 239.2 (2001): 501-508.
Bayly C.I., et. al., A Well-Behaved Electrostatic Potential Based Method Using Charge Restraints For Determining Atom-Centered Charges: The RESP Model J. Phys. Chem. 1993, 97, 10269-10280.
Boek, E. S.; Yakovlev, D. S.; Headen, T. F. Quantitative Molecular Representation of Asphaltenes and Molecular Dynamics Simulation of Their Aggregation. Energy Fuels 2009, 23, 1209-1219.
Cyran, J., et. al., Probing Structural Features of Self-Assembled Violanthrone-79 Using Two Dimensional Infrared Spectroscopy J. Chem. Phys. 2015, 142, 212435.
Darden, T.; York, D.; Pedersen, L. Particle mesh Ewald: An N , log(N) method for Ewald sums in large systems J. Chem. Phys. 1993, 98, 10089-10092.
Derakhshani-Molayousefi, M., & McCullagh, M. (2020). Deterring Effect of Resins on the Aggregation of Asphaltenes in n-Heptane. Energy & Fuels. doi:10.1021/acs.energyfuels.0c030.
Duran, et al., Nature of Asphaltene Aggregates, Energy Fuels 2019, 33, 3694-3710.
Essmann, U., et. al., A smooth particle mesh Ewald method J. Chem. Phys. 1995, 103 8577-8593.
Frederix, P. W. J. M.; Ulijn, R. V.; Hunt, N. T.; Tuttle, T. Virtual Screening for Dipeptide Aggregation: Toward Predictive Tools for Peptide Self-Assembly J. Phys. Chem. Lett. 2011, 2, 2380-2384.
Fu, C.-F; Tian, S.X. A Comparative Study for Molecular Dynamics Simulations of Liquid Benzene J. Chem. Thory Comput. 2011, 7, 2240-2252.
Gallo, et al., Novel procedure for thermal equilibration in molecular dynamics Simulation, Mol Simul. Apr. 1, 2009; 35(5): 349-357. doi:10.1080/08927020802647272.
GaussView, Version 5, Dennington, Roy; Keith, Todd; Millam, John. Semichem Inc., Shawnee Mission, KS, 2009.
Hashmi, S. M.; Firoozabadi, A. Effect of Dispersant on Asphaltene Suspension Dynamics: Aggregation and Sedimentation. J. Phys. Chem. B 2010, 114, 15780-15788.
Headen, T. F.; Boek, E. S.; Jackson, G.; Totton, T. S.; Muller, E. A. Simulation of Asphaltene Aggregation through Molecular Dynamics: Insights and Limitations Energy Fuels, 2017, 31, 1108-1125.
Headen, T. F.; Boek, E. S.; Skipper, N. T. Evidence for Asphaltene Nanoaggregation in Toluene and Heptane from Molecular Dynamics Simulations. Energy Fuels 2009, 23, 1220-1229.
Hess, B., Bekker, H.; Berendsen, H. J. C; Fraaije, J. G. E. M., LINCS: A linear constraint solver for molecular simulations. J. Comput. Chem., 1997 18, 1463-1472.
Hoover, W. G. Canonical Dynamics: Equilibrium Phase-Space Distributions. Phys. Rev. A: At., Mol., Opt. Phys. 1985, 31, 1695-1697.

(Continued)

*Primary Examiner* — Renee Robinson
(74) *Attorney, Agent, or Firm* — Meunier Carlin & Curfman LLC

(57) ABSTRACT

Provided herein are methods of inhibiting the aggregation of asphaltenes, as well as methods of identifying appropriate aggregation inhibitors for asphaltenes.

22 Claims, 26 Drawing Sheets

(56) References Cited

OTHER PUBLICATIONS

Humphrey, W.; Dalke, A.; Schulten, K. VMD: visual molecular dynamics. J. Mol. Graph. 1996, 14, 33-8, 27-8.

Jian, C.; Tang, T.; Bhattacharjee, S. Molecular Dynamics Investigation on the Aggregation of Violanthrone78-Based Model Asphaltenes in Toluene. Energy Fuels 2014, 28, 3604-3613.

Jian, C.; Tang, T.; Bhattacharjee, S. Probing the Effect of Side-Chain Length on the Aggregation of a Model Asphaltene Using Molecular Dynamics Simulations. Energy Fuels 2013, 27, 2057-2067.

Jorgensen W. L., et. al., Development and Testing of the OPLS All-Atom Force Field on Conformational Energetics and Properties of Organic Liquids J. Am. Chem. Soc. 1996 118 45 : 11225-11236.

Kilpatrick, P. K.; Spiecker, P. M. Asphaltene Emulsions. In Encyclopedia of Emulsion Technology; Sjoblom, J., Ed.; Dekker: New York, 2001; Chapter 30, 707-730.

Kuznicki, T.; Masliyah, J. H.; Bhattacharjee, S. Aggregation and Partitioning of Model Asphaltenes at Toluene-Water Interfaces: Molecular Dynamics Simulations. Energy Fuels 2009, 23, 5027-5035.

Leon, O.; Contreras, E.; Rogel, E.; Dambakli, G.; Espidel, J.; Acevedo, S. The Influence of the Adsorption of Amphiphiles and Resins in Controlling Asphaltene Flocculation. Energy Fuels 2001, 15, 1028-1032.

Abraham, et. al., GROMACS User Manual version 5.0.4, www.gromacs.org 2014.

Marques, L. C. C.; Pereira, J. O.; Bueno, A. D.; Marques, V. S.; Lucas, E. F.; Mansur, C. R. E.; Machado, A. L. C.; Gonzalez, G. A Study of Asphaltene-resin Interactions. J. Braz. Chem. Soc. 2012, 23, 1880-1888.

Mullins, O. C. The Modified Yen Model. Energy Fuels 2010, 24, 2179-2207.

Mullins, Oliver C. The asphaltenes. Annual review of analytical chemistry 4 (2011): 393-418.

Nose, S. A molecular dynamics method for simulations in the canonical ensemble Mol. Phys. 1984, 52, 255-268.

Parrinello, M.; Rahman, A . . . A. Polymorphic Transitions in Single-crystals—a New Molecular Dynamics Method J. Appl. Phys. 1981, 52, 7182-7190.

Rogel, E. Simulation of Interactions in Asphaltene Aggregates. Energy Fuels 2000, 14, 566-574.

Rogel, E.; Ovalles, C.; Moir, M. Asphaltene stability in crude oils and petroleum materials by solubility profile analysis. Energy Fuels 2010, 24, 4369-4374.

Schuler, B. et. al., Unraveling the Molecular Structures of Asphaltenes by Atomic Force icroscopy J. Am. Chem. Soc. 2015, 137, 9870-9876.

Sedghi, M.; Goual, L. Role of Resins on Asphaltene Stability. Energy Fuels 2010, 24, 2275-2280.

Sedghi, M.; Goual, L.; Welch, W.; Kubelka, J. Effect of Asphaltene Structure on Association and Aggregation Using Molecular Dynamics. J. Phys. Chem. B 2013, 117, 5765-5776.

Sodero, A. C. R, Investigation of the Effect of Sulfur Heteroatom on Asphaltene Aggregation Energy Fuels 2016, 30, 4758-4766.

Soorghali, F.; Zolghadr, A.; Ayatollahi, S. Effects of Native and Non-Native Resins on Asphaltene Deposition and the Change of Surface Topography at Different Pressures: An Experimental Investigation Energy Fuels 2015, 29, 5487-5494.

Speight, J. G. Petroleum Asphaltenes—Part 1: Asphaltenes, Resins and the Structure of Petroleum. Oil and Gas Science and Technology—Rev. IFP 2004, 59, 467-477.

Spiecker, P. M.; Gawrys, K. L.; Trail, C. B.; Kilpatrick, P. K. Effects of Petroleum Resins on Asphaltene Aggregation and Water-in-oil Emulsion Formation. Colloids Surf., A 2003, 220, 9-27.

Teklebrhan, R. B.; Ge, L.; Bhattacharjee, S.; Xu, Z.; Sjoblom, J. Probing Structure-Nanoaggregation Relations of Polyaromatic Surfactants: A Molecular Dynamics Simulation and Dynamic Light Scattering Study. J. Phys. Chem. B 2012, 116, 5907-5918.

Tukhvatullina, A. Z.; Barskaya, E. E.; Kouryakov, V. N.; Ganeeva, Y. M.; Yusupova, T. N.; Romanov, G. V. Supramolecular Structures of Oil Systems as the Key to Regulation of Oil Behavior J. Pet. Environ. Biotechnol. 2013, 4, 1000152.

Wang, J.; Ferguson, A. L. Mesoscale Simulation of Asphaltene Aggregation. J. Phys. Chem. B 2016, 120, 8016-8035.

\* cited by examiner

B

Model Resins

R1

R2

R3

R4

R5

R6

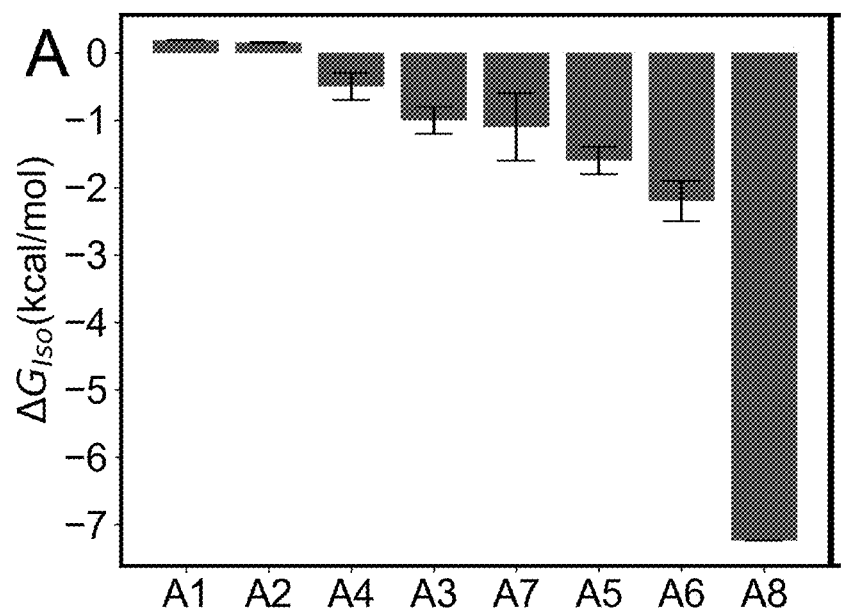
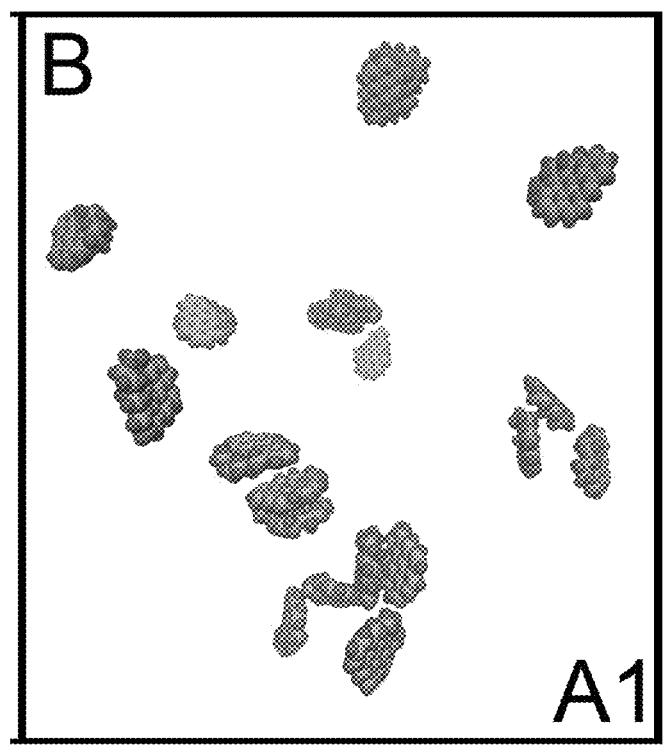
FIGURE 13A
FIGURE 13B

DETERRING AGGREGATION OF ASPHALTENES BY RESINS

CROSS-REFERENCE TO RELATED APPLICATIONS

This application claims benefit of U.S. Provisional Application Ser. No. 62/889,546, filed Aug. 20, 2019, which is incorporated herein by reference in its entirety.

BACKGROUND

Crude oil typically contains one or more solids such as asphaltenes, waxes including parrafins, hydrates and scale, among others. Further, in oil production, generally at some point oil such as crude oil is transported in liquid form through long stretches of pipes. The deposition of these solids from the crude oil onto the interior surfaces of the pipes can have a drastic and negative impact on the oil flow through these pipes.

Asphaltenes, in particular, make up one of the most polar fractions of crude oil, and often will precipitate upon an external stress such as temperature, pressure and/or compositional changes in the oil (resulting from blending or physical/chemical processing). Asphaltenes often precipitate, along with other solids such as paraffin waxes, when crude oil is transported via pipe, such as from a geologic structure to a wellhead via a production pipeline or from a wellhead or a storage vessel to a refinery via a pipeline. Asphaltene deposits can plug downhole tubulars, wellbores, choke off pipes and interfere with the functioning of separator equipment. Precipitated asphaltenes are not desirable, as they can foul and lead to fouling of process equipment.

Under many conditions, the solids present in a fluid will remain dissolved in the fluid. However, when deposition in a pipe occurs, it is generally undesirable because deposited solids can at least partially block the pipe and lead to reduction in the flow rate of the fluid in the pipe and require expensive and time-consuming cleaning of the pipe to restore the maximum or minimum acceptable flow rate of the fluid.

Asphaltenes are generally polyaromatic compounds and variably substituted with alkyl groups, along with heteroatoms such as oxygen, nitrogen, and sulfur and metal atoms (such as Ni, V, or Fe).

Asphaltenes are usually found in heavy crude oils in high quantities, and remain suspended in solution due to their small size and the possible solvating effects of other types of molecules in the petroleum oil or stream. These structures of several molecules are sometimes referred to as asphaltene particles. The asphaltene particles are generally smaller than twenty nanometers in size, but this can vary depending upon several factors such as their concentration in the oil.

It is known that insoluble asphaltenes may precipitate when two or more unprocessed petroleum crude oils and/or refinery process streams are blended together, such that the insoluble asphaltenes form asphaltene aggregates, or large precipitated clusters of asphaltene particles and molecules that stick together due to an attractive interaction. It is believed that this is reinforced when the nonpolar petroleum oil and/or refinery process stream is blended into the oil containing the asphaltenes. These aggregates can sometimes be observed with the unaided naked eye, and are typically physically and optically more dense than the surrounding oil mixture from which they precipitated. These aggregates tend to slowly sediment.

The oil industry spends billions of dollars annually cleaning clogged wellbores and replacing clogged pipelines caused by asphaltene aggregation. Current cleaning methods are inefficient and unfriendly to the environment and replacement of equipment is expensive. Accordingly, improved methods for inhibiting asphaltene aggregation are needed.

SUMMARY

Asphaltenes are a class of macromolecules indigenous to crude oil known to be the primary cause of clogging wellbore and pipelines due to their tendency to aggregate. A molecular level understanding of the aggregation process provides insight into designing new method for alleviating its economic and environmental costs.

Molecular dynamics simulations of the aggregation of a set of model asphaltene molecules are described to gain atomistic insight on the effect of different molecular features on their aggregation behavior. The aggregation behavior of eight model asphaltenes has been categorized as either non-aggregating, mildly-aggregating, or readily-aggregating based on the asphaltene's aggregation propensity (AP) and cluster size. AP values were computed using solvent accessible surface area (SASA). Cluster size was computed by measuring the distance of aromatic planes. Using same metrics, it was determined that resins with certain molecular features interrupt aggregation of asphaltenes in early stages of aggregation. Resins with similar characteristics to the asphaltene tend to interact directly and interrupt aggregation of asphaltenes by limiting n-n stacking.

The results described herein suggest that natural resins (e.g., petroleum resins), synthetic resins, or a combination thereof can be selected and used to inhibit asphaltene aggregation.

For example, using the methods described herein, an appropriate resin (or combination of resins) can be selected to inhibit aggregation of an asphaltene (or a combination of asphaltenes). In such examples, a hydrocarbon mixture comprising one or more asphaltenes can be analyzed to identify the one or more asphaltenes present in the hydrocarbon mixture. A plurality of available resins can then be screened using the methods described herein to identify one or more suitable resins for use as aggregation inhibitors for the asphaltenes in the hydrocarbon mixture. The one or more suitable resins can then be added to the hydrocarbon mixture to inhibit aggregation of an asphaltene in the mixture (e.g., to prevent aggregation of an asphaltene, or to solubilize an aggregated asphaltene).

In some examples, these methods can be used to prevent asphaltene precipitation, for example, in a pipeline and/or a wellbore. As an example, medium and heavy crude contains ample quantities of resins. Using the methods described above, a medium or heavy crude containing a suitable resin to inhibit aggregation of an asphaltene in a lighter crude fraction can be identified. The medium or heavy crude can then be used to prevent deposition problems in lighter crudes, for example, in pipelines and wellbores. In this way, natural components of crude oil (resins) can be used to prevent aggregation.

Based on the methods described herein, effective resins aggregation inhibitors can be used as starting points from which to design more efficient inhibitors (e.g., synthetic resins) of aggregation.

BRIEF DESCRIPTION OF DRAWINGS

FIGS. 13A-13D illustrate the aggregation classes of neat model asphaltenes used in Example 3. FIG. 13A is a plot showing the $\Delta G_{iso}$ values of all eight model asphaltenes simulated for this study in descending order of $\Delta G_{iso}$. FIG. 13B is a representative snapshot from the simulation of non-aggregating model asphaltene A1. FIG. 13C is a representative snapshot from the simulation of mildly-aggregating model asphaltene A4. FIG. 13D is a representative snapshot of readily aggregating model asphaltene A8.

FIG. 17A shows the number of aggregates of for A4, A6, and A8 vs. time. Mildly-aggregating A4 stay in nanoaggregates form with average size of five molecules, whereas A6 and A8 cluster and flocculate. FIG. 17B shows nanoaggregates of A4 in a neat state. A4 does not grow to form clusters and occulates and stays in form of nanoaggregates. FIGS. 17C and 17D show clustering and flocculation of A6 and A8 nanoaggregates in their neat state where A6 assembles mostly in rod shaped structures.

FIG. 20A shows the Number of aggregates for A4, A6, and A8 vs. time in the presence of resin. The average aggregate size varies between 2-10 molecules which shows lack of clusters and flocculates in the presence of resin. FIG. 20B shows A4 in the presence of resin stays in nanoaggregate form with smaller nanoaggregate size. As shown in FIGS. 20C and 20D, both A6 and A8 are stabilized in nanoaggregate form and do not proceed to clustering and flocculation. Resin interacts with the surface of nanoaggregates to prevent further aggregation of A6 and A8.

FIG. 21A shows that in the absence of resin the readily aggregating asphaltenes A6 and A8 follow an exponential decay pattern while the mildly-aggregating A4 follows a normal distribution pattern of aggregate numbers. FIG. 21B shows that in the presence of resin the distribution of all asphaltenes are shifted to the right to larger number of aggregates. For A6 and A8 it shifts from clustering and flocculates to nanoaggregation and for A4 it shifts toward more number of aggregates with smaller size nanoaggregates.

DETAILED DESCRIPTION

Definitions

Figure 1:
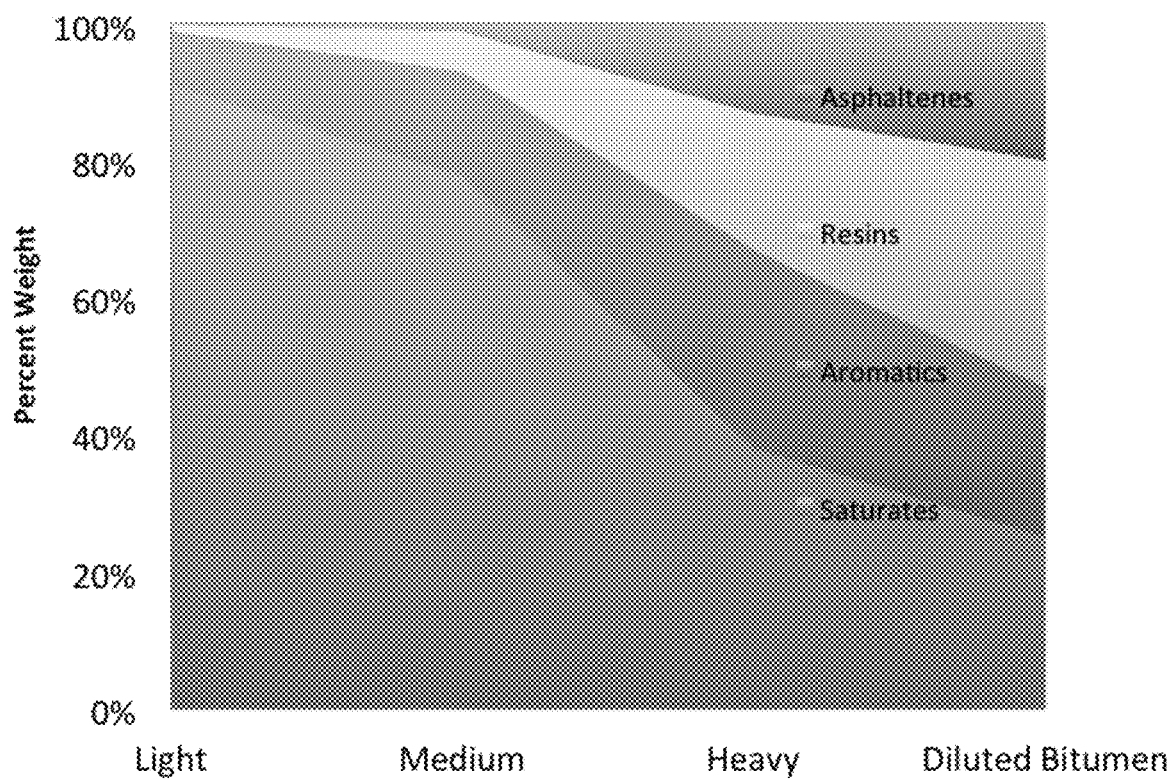
FIG. 1 shows the percentages of each SARA component in various types of crude oil.

Unless otherwise indicated, the abbreviations used herein have their conventional meaning within the chemical and geophysical arts.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B). The phrases "combinations thereof" and "any combinations thereof are used synonymously herein.

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area).

"Wellbore" refers to a continuous hole for use in hydrocarbon recovery, including any openhole or uncased portion of the wellbore. For example, a wellbore may be a cylindrical hole drilled into the formation such that the wellbore is surrounded by the formation, including rocks, sands, sediments, etc. A wellbore may be used for injection. A wellbore may be used for production. A wellbore may be used for hydraulic fracturing of the formation. A wellbore even may be used for multiple purposes, such as injection and production. The wellbore may have vertical, inclined, horizontal, or any combination of trajectories. For example, the wellbore may be a vertical wellbore, a horizontal wellbore, a multilateral wellbore, or slanted wellbore. The wellbore may include a "build section." "Build section" refers to practically any section of a wellbore where the deviation is changing. As an example, the deviation is changing when the wellbore is curving. The wellbore may include a plurality of components, such as, but not limited to, a casing, a liner, a tubing string, a heating element, a sensor, a packer, a screen, a gravel pack, etc. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift. The term wellbore is not limited to any description or configuration described herein. The term wellbore may be used synonymously with the terms borehole or well.

The term "contacting" as used herein, refers to materials or compounds being sufficiently close in proximity to react or interact. For example, in methods of contacting an unrefined petroleum material, a hydrocarbon-bearing formation, and/or a wellbore, the term "contacting" can include placing a compound (e.g., a surfactant) or an aqueous composition (e.g., chemical, surfactant or polymer) within a hydrocarbon-bearing formation using any suitable manner known in the art (e.g., pumping, injecting, pouring, releasing, displacing, spotting or circulating the chemical into a well, wellbore or hydrocarbon-bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e., organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) (i.e., API gravity) and market price in comparison to light (or sweet) crude oils. Crude oil may also be characterized by its Equivalent Alkane Carbon Number (EACN). The term "API gravity" refers to the measure of how heavy or light a petroleum liquid is compared to water. If an oil's API gravity is greater than 10, it is lighter and floats on water, whereas if it is less than 10, it is heavier and sinks. API gravity is thus an inverse measure of the relative density of a petroleum liquid and the density of water. API gravity may also be used to compare the relative densities of petroleum liquids. For example, if one petroleum liquid floats on another and is therefore less dense, it has a greater API gravity.

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin-based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g., precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

Methods

Provided herein are methods of selecting an aggregation inhibitor for an asphaltene. The methods can comprise defining a classical force field describing an internal geometry and a charge distribution of the asphaltene; calculating an equilibrium aggregate size distribution of the asphaltene by thermal equilibration; and calculating an equilibrium aggregate size distribution of the asphaltene in the presence of a potential aggregation inhibitor by thermal equilibration.

A decrease in the equilibrium aggregate size in the presence of the potential aggregation inhibitor can indicate that the potential aggregation inhibitor is a suitable aggregation inhibitor for the asphaltene. For example, in some embodiments, a threshold value for the decrease (e.g., a decrease of at least 10%, at least 25%, or at least 50%) is used, such that a decrease of at least 10%, at least 25%, or at least 50% in the equilibrium aggregate size in the presence of the potential aggregation inhibitor indicates that the potential aggregation inhibitor is a suitable aggregation inhibitor for the asphaltene. In some embodiments, when the decrease in the equilibrium aggregate size in the presence of the potential aggregation inhibitor is at least 10%, at least 25%, or at least 50%, the potential aggregation inhibitor is selected as a suitable aggregation inhibitor for the asphaltene.

In some embodiments, these methods can be performed using a series of potential aggregation inhibitors in order to, for example, select the most suitable (most appropriate) aggregation inhibitor from a plurality of potential aggregation inhibitors. These methods can comprise defining a classical force field describing an internal geometry and a charge distribution of the asphaltene; calculating an equilibrium aggregate size distribution of the asphaltene by thermal equilibration; calculating an equilibrium aggregate size distribution of the asphaltene in the presence of each of a plurality of potential aggregation inhibitors by thermal equilibration; determining an increase or a decrease in the equilibrium aggregate size in the presence of each of the plurality of potential aggregation inhibitors; and selecting the aggregation inhibitor which exhibits the largest decrease in the equilibrium aggregate size as a suitable aggregation inhibitor for the asphaltene. Using these methods, an individual can select the most appropriate aggregation inhibitor for a particular asphaltene (or combination of asphaltenes) from a library of available aggregation inhibitors.

Also provided are method of selecting an aggregation inhibitor for an asphaltene that comprise defining one or more molecular parameters for the asphaltene; defining one or more molecular parameters for each of a plurality of potential aggregation inhibitors; estimating an aggregation propensity for the asphaltene in the presence of each of the plurality of potential aggregation inhibitors; and selecting the potential aggregation inhibitor which exhibits the smallest aggregation propensity as a suitable aggregation inhibitor for the asphaltene.

Estimating the aggregation propensity for the asphaltene in the presence of each of the plurality of potential aggregation inhibitors can comprise correlating the one or more molecular parameters for the asphaltene and the one or more molecular parameters for each of the plurality of potential aggregation inhibitors with the aggregation propensity, for example using known methods such as linear regression analysis.

The one or more molecular parameters can comprise any of a variety of suitable molecular parameters. Examples of suitable molecular parameters include a total number of atoms, a number of aromatic carbons, a number of aliphatic carbons, a number of heteroatoms, a number of carbon atoms, a ratio of number of aromatic carbons to number of aliphatic carbons, a ratio of number of aliphatic carbons to number of aromatic carbons, a ratio of number of carbon atoms to number of heteroatoms, a ratio of number of heteroatoms to number of carbon atoms, a ratio of total number of atoms to number of carbon atoms, a ratio of number of carbon atoms to total number of atoms, a ratio of total number of atoms to number of heteroatoms, a ratio of number of heteroatoms to total number of atoms, a molecular weight, a number of aromatic rings, a number of aliphatic rings, a number of rings, a number of aliphatic chains, a ratio of a number of aromatic rings to a number of aliphatic rings, a ratio of a number of aliphatic rings to a number of aromatic rings, or any combination thereof.

In some embodiments, the one or more molecular parameters for the asphaltene comprise at least 2 (e.g., at least 3, at least 4, at least 5, or at least 6) molecular parameters.

In some embodiments, the one or more molecular parameters for each of a plurality of potential aggregation inhibitors comprise at least 2 (e.g., at least 3, at least 4, at least 5, or at least 6) molecular parameters.

In some embodiments, the one or more molecular parameters for the asphaltene are the same as the one or more molecular parameters for each of a plurality of potential aggregation inhibitors.

In some of the methods described above, the aggregation inhibitor can comprise a natural resin, a synthetic resin, or a combination thereof. In certain embodiments, the aggregation inhibitor can comprise a petroleum resin.

The methods described above can be used to identify suitable aggregation inhibitors for use in inhibiting asphaltene aggregation. Accordingly, also provided are methods of inhibiting asphaltene aggregation from a hydrocarbon mixture comprising an asphaltene that comprise selecting a suitable aggregation inhibitor for the asphaltene using a method described above; and adding the aggregation inhibitor to the hydrocarbon mixture.

In some embodiments, the method can further comprises assaying the hydrocarbon mixture to structurally identify the asphaltene present in the hydrocarbon mixture.

In some embodiments, the aggregation inhibitor can comprise a natural resin (e.g., a petroleum resin); and adding the aggregation inhibitor to the hydrocarbon mixture can comprise adding a second hydrocarbon mixture comprising the natural resin to the hydrocarbon mixture comprising the asphaltene.

In some embodiments, inhibiting asphaltene aggregation can comprise preventing asphaltene aggregation. For example, in some embodiments, the hydrocarbon mixture can be in contact with equipment associated with an oil and gas operation, and adding the aggregation inhibitor to the hydrocarbon mixture can decrease the rate of aggregate formation on the equipment associated with an oil and gas operation. The equipment associated with an oil and gas operation can comprise surface processing equipment, downhole equipment, pipelines and associated equipment, pumps, or other equipment which contacts hydrocarbons during the course of an oil and gas operation.

In some embodiments, inhibiting asphaltene aggregation can comprise solubilizing an aggregated asphaltene. For example, in some embodiments, the aggregated asphaltene can be present on equipment associated with an oil and gas operation, and adding the aggregation inhibitor to the hydrocarbon mixture can solubilize the aggregated asphaltene on the equipment associated with an oil and gas operation. In some embodiments, the aggregated asphaltene can be present on a natural solid material, such as rock or regolith. Adding the aggregation inhibitor to the hydrocarbon mixture can solubilize the aggregated asphaltene present on a natural solid material. In some embodiments, the natural solid material can comprise tar sands, oil sands, or a combination thereof.

Also provided are methods of displacing an asphaltene aggregate in contact with a solid material. These methods can comprise selecting a suitable aggregation inhibitor for the asphaltene using the methods described herein; contacting the asphaltene aggregate with the aggregation inhibitor, wherein the asphaltene aggregate is in contact with the solid material; and allowing the asphaltene aggregate to separate from the solid material, thereby displacing the asphaltene aggregate in contact with the solid material.

The solid material may be a natural solid material (i.e., a solid found in nature such as rock). The natural solid material may be found in a petroleum reservoir. In some embodiments, the method is an enhanced oil recovery method. Enhanced oil recovery methods are well known in the art. A general treatise on enhanced oil recovery methods is Basic Concepts in Enhanced Oil Recovery Processes edited by M. Baviere (published for SCI by Elsevier Applied Science, London and New York, 1991). For example, in an enhanced oil recovery method, the displacing of the asphaltene aggregate in contact with the solid material is accomplished by contacting the asphaltene aggregate with the aggregation inhibitor, wherein the asphaltene aggregate is in contact with the solid material. The asphaltene aggregate may be in an oil reservoir. The aggregation inhibitor or composition comprising the aggregation inhibitor can be pumped into the reservoir in accordance with known enhanced oil recovery parameters. The aggregation inhibitor can be pumped into the reservoir as part of an aqueous composition or a hydrocarbon composition.

In some embodiments, the natural solid material can be rock or regolith. The natural solid material can be a geological formation such as clastics or carbonates. The natural solid material can be either consolidated or unconsolidated material or mixtures thereof. The hydrocarbon material may be trapped or confined by "bedrock" above or below the natural solid material. The hydrocarbon material may be found in fractured bedrock or porous natural solid material. In other embodiments, the regolith is soil. In other embodiments, the solid material can be, for example, oil sand or tar sands.

In other embodiments, the solid material can comprise equipment associated with an oil and gas operation. For example, the solid material can comprise surface processing equipment, downhole equipment, pipelines and associated equipment, pumps, and other equipment which contacts hydrocarbons during the course of an oil and gas operation.

The methods described herein can also be used to identify (and ultimately prepare) synthetic aggregation inhibitors suitable to inhibit the aggregation of an asphaltene. Methods for identifying a synthetic aggregation inhibitor for an asphaltene can comprise defining a chemical structure of a proposed synthetic aggregation inhibitor; defining a classical force field describing an internal geometry and a charge distribution of the asphaltene; calculating an equilibrium aggregate size distribution of the asphaltene by thermal equilibration; calculating an equilibrium aggregate size distribution of the asphaltene in the presence of the proposed synthetic aggregation inhibitor by thermal equilibration; and determining an increase or a decrease in the equilibrium aggregate size in the presence of each of the proposed synthetic aggregation inhibitor. A decrease in the equilibrium aggregate size in the presence of the proposed synthetic aggregation inhibitors can indicate that the proposed aggregation inhibitor is a suitable synthetic aggregation inhibitor for the asphaltene. If desired, the suitable synthetic aggregation inhibitor can then be synthesized and employed in conjunction with the methods described above.

In some embodiments, this method can be performed iteratively so as to arrive at a suitable synthetic aggregation inhibitor. These methods can comprise defining the chemical structure of a second proposed synthetic aggregation inhibitor by modification of a chemical moiety present in the first synthetic aggregation inhibitor; defining a classical force field describing an internal geometry and a charge distribution of the asphaltene; calculating an equilibrium aggregate size distribution of the asphaltene by thermal equilibration; calculating an equilibrium aggregate size distribution of the asphaltene in the presence of the proposed synthetic aggregation inhibitor by thermal equilibration; and determining an increase or a decrease in the equilibrium aggregate size in the presence of each of the second proposed synthetic aggregation inhibitor. A larger decrease in the equilibrium aggregate size in the presence of the second proposed synthetic aggregation inhibitor as compared to the first proposed synthetic aggregation inhibitor can indicate that the second proposed synthetic aggregation inhibitor is a more suitable synthetic aggregation inhibitor for the asphaltene than the first proposed aggregation inhibitor. When the second proposed synthetic aggregation inhibitor is found to be more suitable, the second proposed synthetic aggregation inhibitor can then be used as the starting point for the next chemical modification (so as to arrive at a next proposed synthetic aggregation inhibitor) which can be similarly assessed for its efficacy as an aggregation inhibitor. When the second proposed synthetic aggregation inhibitor is found to be less suitable, the first proposed synthetic aggregation inhibitor can be used as the starting point for the next (different) chemical modification (so as to arrive at a next proposed synthetic aggregation inhibitor) which can be similarly assessed for its efficacy as an aggregation inhibitor. This process can be conducted a plurality of times so as to identify a preferred synthetic aggregation inhibitor (e.g., the synthetic aggregation inhibitor produces the largest decrease in the equilibrium aggregate size).

By way of non-limiting illustration, examples of certain embodiments of the present disclosure are given below.

EXAMPLES

The examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, percents associated with components of compositions are percents by weight, based on the total weight of the composition including the components, temperature is in ° C. or is at ambient temperature, and pressure is at or near atmospheric.

Example 1: The Effect of Resins on Asphaltene Aggregation Propensity

Aggregation of asphaltene molecules causes clogging in the crude oil pipelines and, as a result, an economic burden on the petroleum industry. The majority of the research on the aggregation process is focused on the behavior of fractionated asphaltenes from crude oil without considering the effects of specific chemical structures. Moreover, the role of other components of the crude oil such as resin molecules is not clear. In this example, we have performed structure specific studies of asphaltene by performing all-atom molecular dynamics simulations (MD) to quantify the aggregation propensity of eight types of model asphaltene molecules. Furthermore, we seek to understand the role of resin in the aggregation of asphaltenes by studying these eight asphaltene systems in the presence of six distinct resins with different molecular structures. By performing solvent accessible surface area (SASA) and maximum aggregate size analyses for the aggregates, we observe a negative correlation between the presence of resin and the aggregation tendency of the asphaltenes.

Background

Asphaltenes are macromolecules indigenous to crude oil known to be responsible for forming deposits in pipelines and other petroleum industry equipment via aggregation. Billions of dollars are spent annually to clean up asphaltene-clogged pipelines and other petroleum industry equipment. There are various methods of cleaning clogged pipelines such as replacing the equipment, pulse pressurizing pipelines and chemical treatments. These methods are either costly or harmful to the environment. Furthermore, these methods are treatments rather than prevention. Understanding the aggregation process will lead to modified oil extraction and production processes that will minimize asphaltene deposition and subsequently minimize economic and environmental consequences.

One important composition classification for the crude oil is known as SARA composition, which stands for: saturates, aromatics, resins, and asphaltenes. The ratio of these components differs depending on the crude type. Saturates are composed of linear or branched alkanes such as hexane and heptane. Molecular derivatives of benzene, such as toluene and xylene, are classified into the aromatic class. Light crude mainly contains saturates and aromatics while, for medium and heavy crude the ratio of resins and asphaltenes are substantial compared to saturates and aromatics. FIG. 1 shows the proportion of these components for each crude type.

Figure 2:
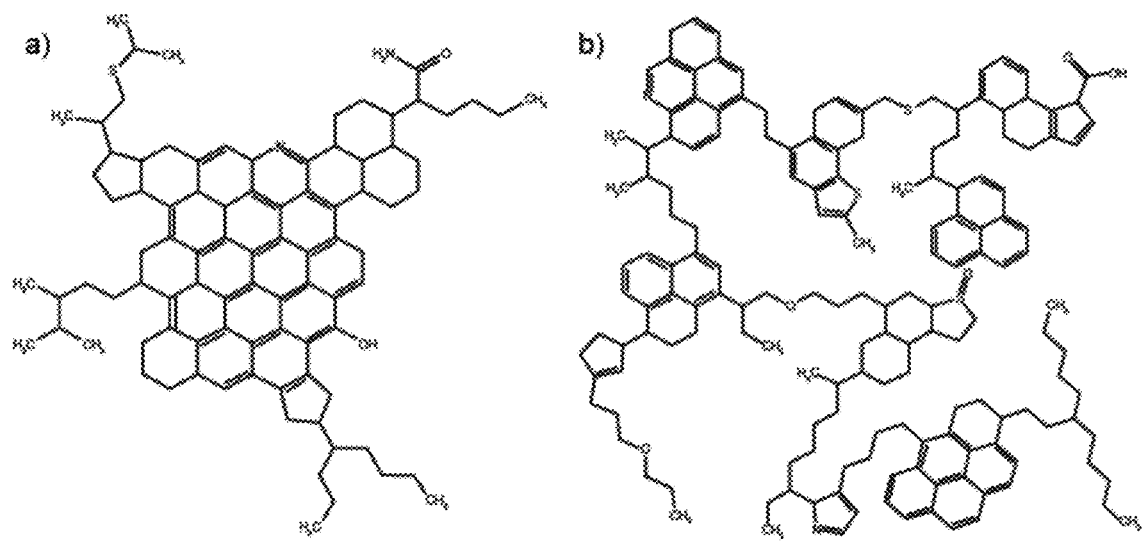
FIG. 2 shows the molecular structure of a typical continental (a) and archipelago (b) asphaltene.

Asphaltenes are the heaviest component of crude oil and they are solubility class of molecules. They are defined as n-heptane insoluble and toluene soluble. These molecules are composed of aromatic cores as well as aliphatic chains, which may or may not contain heteroatoms. Sulfur, nitrogen, and oxygen are the most abundant heteroatom in crude oil. There are two primary types of asphaltene molecules: continental and archipelago. Continental asphaltenes include a large aromatic plane, to which aliphatic chains are attached, while archipelago asphaltenes are composed of multiple small aromatic planes connected to each other by aliphatic chains (FIG. 2).

Similar to asphaltenes, resins are made of an aromatic core with aliphatic chains, and they may or may not contain heteroatoms. As opposed to asphaltenes, resins have smaller aromatic cores as well as lower molecular weight. Resins are the second heaviest component of crude oil. The role of resins in the aggregation of the asphaltene molecules is not clear in the literature. They are known both as agents that either promote or demote aggregation of the asphaltenes.

For example, it has been observed that when resins extracted from one crude with a low tendency to form aggregate are injected to another crude with a high tendency to aggregate, the amount of the deposit decreases compared to the time that there were just native crudes in the crude with a high tendency to aggregate. Also, a positive correlation has been observed between the concentration of resin and stability of asphaltenes. Also, using AFM methods, a decrease in roughness of the deposited surface was observed in a higher concentration of resin.

The Yen-Mullins model is a well-known and widely accepted model for the aggregation of asphaltenes. This theory states that asphaltenes aggregate in two main steps. In the first step, approximately 5-7 individual asphaltene molecules form nanoaggregates. In the second step, these nanoaggregates further aggregate and become macroscopic aggregates. Various experimental studies have been performed to study the aggregation behavior of asphaltenes as a class of molecules. In such studies, the asphaltene fraction of crude oil is extracted and then their aggregation behavior is studied using different variables such as the effect of solvent, temperature, pressure, the concentration of asphaltene molecules, and the concentration of resin. The majority of these studies do not study details of specific molecular interactions throughout the aggregation process.

One main issue in doing a molecularly focused study is the practicality of such research. Since asphaltenes and resins are a class of molecules, there are numerous variations of them.

There are two potential experimental ways to study asphaltene aggregation from molecular standpoint: separation or synthesis of such molecules. By targeted synthesizing or separating molecules containing certain molecular aspects such as the type of heteroatom, size of the aromatic plane, size of aliphatic chain, and hydrogen bond capacity, molecular specific research can be done on aggregation of asphaltenes. Moreover, synthesizing model asphaltene molecules is not an easy task. Only a few studies have implemented this approach to elucidate the effect of various molecular aspects of asphaltenes and resin molecules in the aggregation behavior of asphaltenes.

A handful of computational studies have revealed the effect of certain molecular aspects of asphaltene molecules on their aggregation behavior. For example, it has been showed that the size of the aromatic core is positively correlated with aggregation tendency of asphaltene molecules. Also, the presence of an aliphatic chain has been shown to have a negative effect on aggregation through steric hindrance. The presence of a heteroatom has also been shown to increase the tendency of asphaltenes to aggregate. Despite this research, no structurally systematic study has been performed to comprehensively elucidate the relationship between the resin and asphaltene molecules in the aggregation behavior of asphaltenes. Molecular insight into the role of resins in asphaltene aggregation has been achieved neither through experimental research nor systematically through computational studies. Experimental studies do not provide atomic resolution of the dynamics of the aggregation process.

Knowing the details of molecular interaction in atomic level can provide insight on significant forces in the aggregation process. Such insight is achievable using molecular dynamics (MD) simulations. Since the specific molecular structure of most asphaltenes is unknown, the model study, which examines the effect of different molecular characteristics is useful for decoding mechanism of the aggregation process. Computational models give the freedom of constructing molecules that are not easy to synthesize. In this example, MD simulations were performed to probe the role of resins in aggregation behavior of eight asphaltenes. The aggregation behavior of overall fifty-six systems composed of eight types of asphaltene molecules as well as each asphaltene in the presence of six types of resin molecules were investigated. All systems are simulated in n-heptane, which is a C7 size linear alkane.

Open Questions and Specific Aims

Aggregation tendency of asphaltene molecules is not quantified in a relationship with their structures. Also, the role of resin in the aggregation of asphaltenes is not clear from a molecular standpoint. Two quantities were measured to study the aggregation dynamics of each system. One metric was the aggregate size, which was the number of individual asphaltene molecules in an aggregate. The other metric was the solvent accessible surface area (SASA) of all the aggregates in a system. Asphaltene molecules that aggregate have large aggregate size with a decrease in SASA. Using these metrics, we first quantified the aggregation tendency of neat asphaltenes. Once we categorized asphaltene molecules based on their aggregation behavior, using the same metric, we quantified their aggregation tendency in the presence of resin. We hypothesized that resins can interact both with n-heptane and asphaltenes. Such interactions were hypothesized to create a barrier between asphaltene nanoaggregates and prevent them from further aggregating. This behavior could serve as a deterring effect on aggregation of asphaltene molecules. In third specific aim, we sought to find more structure specific evidence for the correlation between the presence of resin and different aggregation tendency of asphaltenes.

Methods

Figure 3:
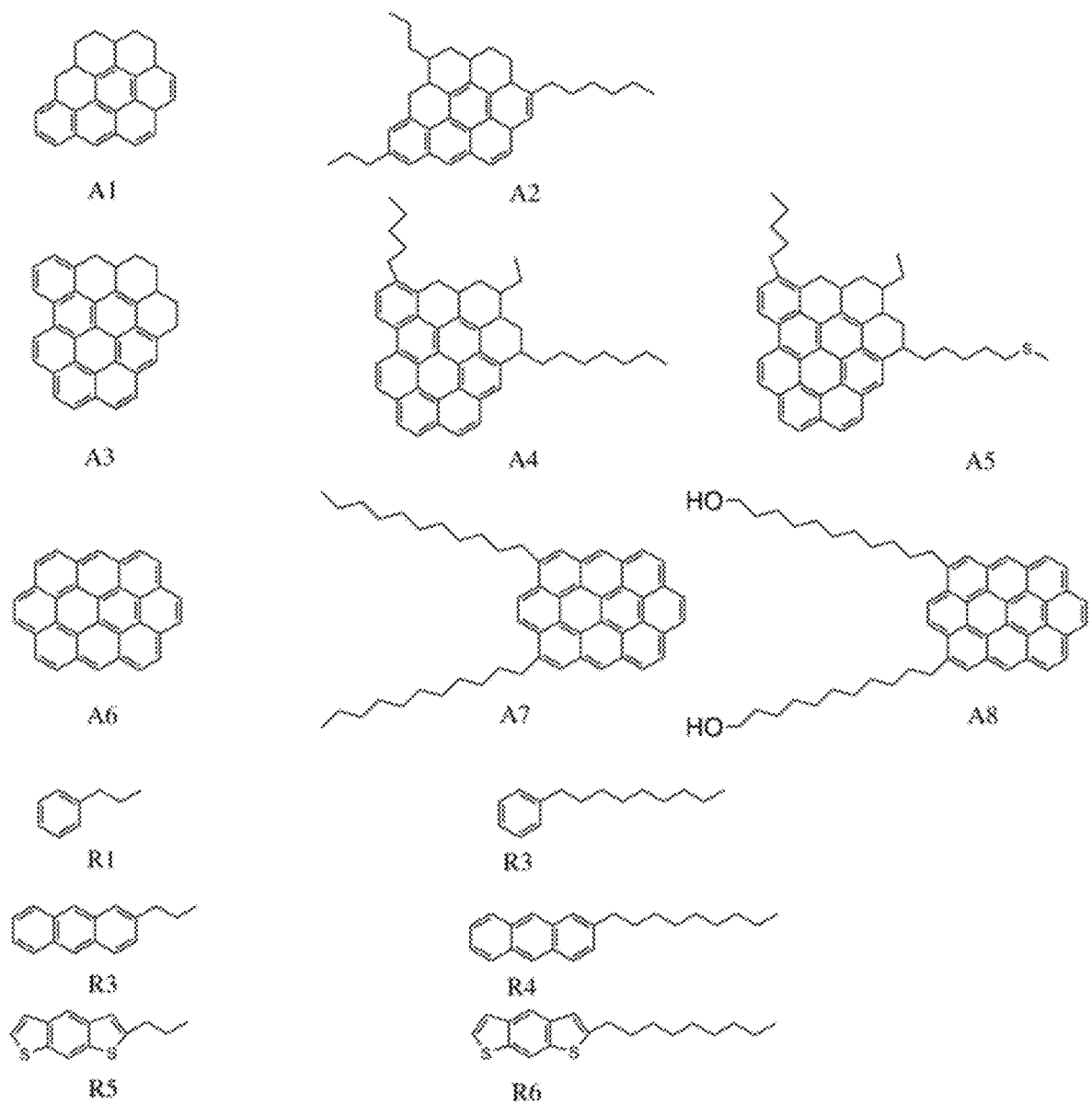
FIG. 3 shows the molecular structure of asphaltene and resin molecules used to study the effects of different aromatic core sizes, aliphatic chain size, and heteroatoms on the aggregation of asphaltenes.

Model Asphaltene and Resin Set. Asphaltene molecules have a wide distribution of sizes. However, for practical reasons, a set of representative conceptual model asphaltene molecules was chosen for study in this work. All of the model asphaltene molecules in this work were of the continental type. Theses asphaltenes contain a large aromatic core and have a high tendency to aggregate. Also, a set of resin molecules was designed for a systematic study of the effect of resins on asphaltene aggregation. The chemical structures of these select model molecules are presented in FIG. 3.

These molecules differ in size of aromatic core, presence and length of aliphatic chain, and presence of a heteroatom. Some of the model asphaltenes were inspired either by previous computational studies or recent atomic force microscopy (AFM) studies of asphaltene structures. The cores of the model asphaltene molecules here are composed of 4-10 aromatic rings.

Simulation Procedure. All of the individual asphaltene and resin structures were built in GaussView V.5.0. (A GUI for Gaussian simulation package). 30 and Gaussian0931 was used to optimize all structures. Density Functional Theory (DFT) method, B3LYP exchange-correlation functional and basis set of 6-31+G(d) were used. The restricted electrostatic potential (RESP) procedure was utilized to find partial charges on individual atoms of each structure. GROMACS (version 5.0.4) was used as the molecular dynamics (MD) package. The OPLS force filed was used to model all inter and intramolecular interactions.

In each of the eight asphaltene simulation systems, twenty asphaltene molecules were inserted in the box with random orientation and were solvated in explicit n-heptane. Box dimensions are 6.8 nm×6.8 nm×6.8 nm. The concentration of asphaltene in each system was 100 mM. To study the effect of resin on the aggregation behavior of asphaltenes, one type of resin paired with each type of asphaltene with a constant resin to asphaltene mass ratio (Rw/Aw=5). This value is a typical resin to asphaltene mass ratio in a medium crude. Pairing eight types of asphaltene with six types of resins results in forty-eight systems total. For all systems of study, the simulations were performed in the isothermal-isobaric ensemble (NPT). Nose-Hoover and Parrinello-Rahman algorithms were used to keep average temperature and pressure constant at 300K and 1 bar, respectively. Cubic periodic boundary condition was applied for all of the systems to simulate infinite bulk behavior. Also, for all system, the integration time step is 2 fs and energies and coordinates were written every 2 ps. The LINCS algorithm was used to constrain the bonds. A cut-off distance of 1.4 nm was applied to calculate nonbonded interactions including electrostatics and Van der Waals (VdW). Long-range electrostatic interactions were treated by Particle Mesh Ewald (PME). Initial configuration of each system was energy minimized by using the steepest descent method to remove any existing high-energy structures. This was followed by 5 ns for equilibration. 250 ns of production run was performed for each system.

Figure 4:
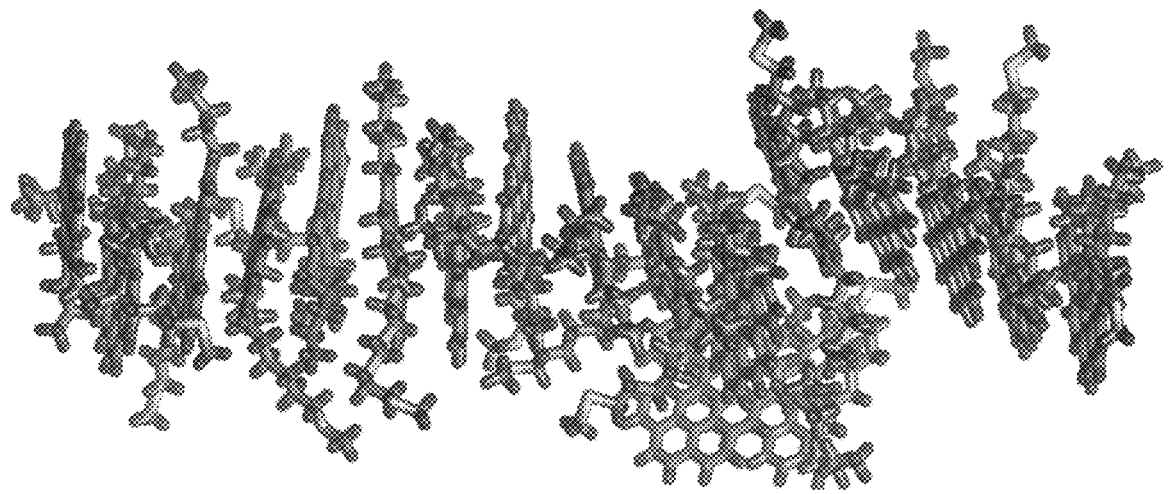
FIG. 4 illustrates stacked A5 asphaltenes in n-heptane. Solvent molecules were removed for clarity.

Data Analysis Procedure. It is required to use a metric that is indicative of different aggregation status along the trajectory to monitor aggregation behavior of each asphaltene type. Two main analyses were utilized for this purpose. The first analysis employs a clustering algorithm to count the number of asphaltene molecules in each aggregate. There are two types of aggregates in all systems studied. The first kind is stacking; the other kind is flocculation, which is the further aggregation of stacked asphaltenes. Stacking starts with dimerization followed by trimerization and so on until they form nanoaggregates of a certain size dependent on the asphaltene type. This kind of aggregation is in the form of face-to-face stacking in which, aromatic cores face each other. Later on, these nanoaggregates come together and form larger aggregates by offset stacking. FIG. 4 shows aggregated A5 asphaltenes, which have formed face-to-face and offset stacks.

The clustering algorithm does not distinguish between these two types of aggregates. If the atomic distance between two adjacent molecules is equal or less than a cut-off distance, these molecules are counted as part of the same aggregate. A cut-off distance of 0.35 nm was used to measure aggregate size. This value was chosen so that the result of clustering analysis was consistent with visual analysis. Nanoaggregates are of the stacked type. Flocculation is the further aggregation of nanoaggregates. Furthermore, maximum aggregation size vs. time, as well as the probability distribution of each aggregate size, was calculated.

The second analysis is the solvent accessible surface area (SASA) of the twenty asphaltene molecules If the SASA value decreases during simulation, it is indicative of aggregation for that particular type of asphaltene. Furthermore, SASA calculations were utilized to compute a single scalar quantity of aggregation propensity (AP). AP is simply the ratio of first and last SASA value for each simulation. Asphaltene molecules with high aggregation propensity have a lower value of SASA toward the end of the simulation compared to the initial structure. Built-in GROMACS (version 5.0.4) analysis programs were used to perform SASA and cluster size analyses.39,40 VMD was used for visualization Results and Discussion Aggregation Behavior of Neat Asphaltenes. To explore the effect of resins in the aggregation of asphaltenes, we study the aggregation behavior of neat asphaltenes. Examining aggregation behavior of eight types of asphaltenes by SASA and maximum aggregate size analyses reveal that the asphaltene types have different tendencies to aggregate. Some asphaltenes, such as A1, never reach a stable large aggregate size, and some asphaltenes, such as A8, reach maximum aggregation size of 20.

To categorize asphaltenes based on their aggregation behavior, we use SASA and cluster size analysis. Due to the limit on the number of the asphaltenes in each box, it is not easy to distinguish between asphaltenes that have a medium tendency to aggregate and the ones that have high tendency to aggregate. Hence, the SASA value of asphaltene molecules was used to define a single scalar quantity of aggregation propensity (AP). The ratio of initial SASA value to the final value is called aggregation propensity (AP) for that particular asphaltene molecule. The higher the AP value is, the higher tendency that particular type of asphaltene molecule has for aggregation. Depending on the tendency of a particular asphaltene molecule to aggregate, the rate of change and the final value of SASA differ.

Figure 5:
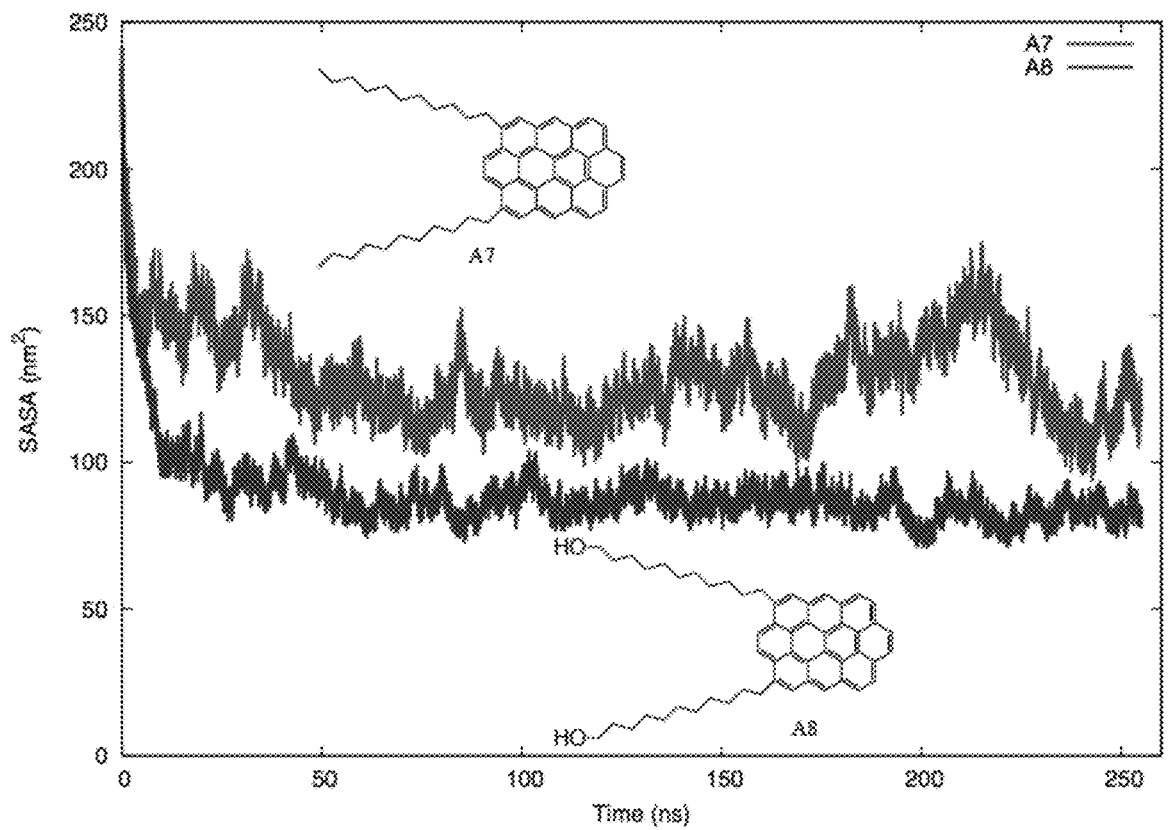
FIG. 5 is a plot showing SASA value vs. time for both A7 and A8. A7 is not capable of forming hydrogen bond while A8 has two hydroxyl groups, which improves stability of the aggregate formed by A8 via hydrogen bond formation.

Different molecular aspects are important in aggregation behavior of asphaltene molecules. The size of the aromatic core, the presence of aliphatic chain(s), the presence of heteroatom(s), and hydrogen bonding capacity are among those factors. An increase in the size of the aromatic core size increases maximum aggregation size as well as AP value of the asphaltene. For example, A3 (with eight fused benzene rings) forms larger maximum aggregate size compared to A1 (with four fused benzene rings). Presence of aliphatic chain(s) decreases the aggregation tendency of the asphaltene as can be observed for A3 and A6 compared to A4 and A7. (FIG. 9) Due to the presence of aliphatic chains and their solubility in n-heptane, A4 forms less stable aggregates than A3, which leads to lower AP value for A4 compared to A3. Presence of a heteroatom such as sulfur increases tendency to aggregate as A5 has higher AP value compared to A4. Adding hydrogen bonding capability to an asphaltene increases its propensity of aggregation. A8 containing two hydroxyl groups makes more stable aggregates compared to A7 with no hydrogen bonding capacity (FIG. 5)

Figure 6:
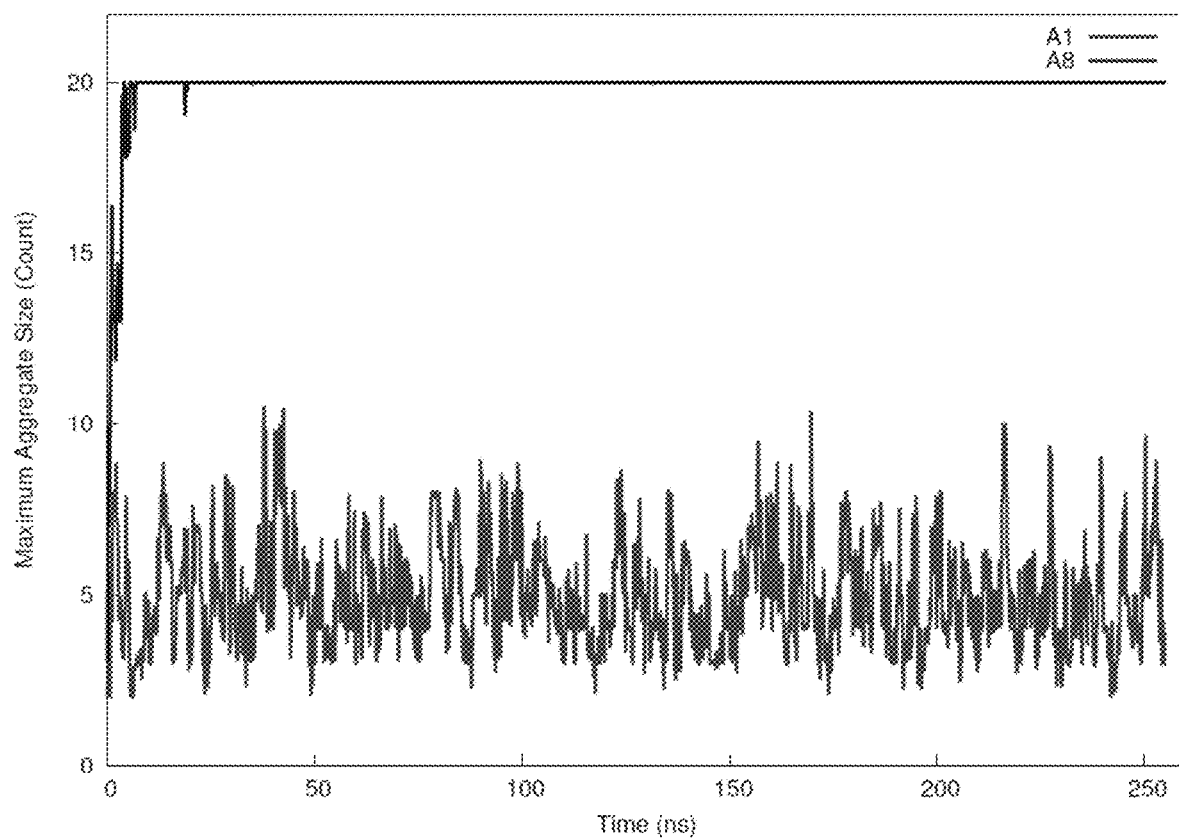
FIG. 6 is a plot showing the maximum aggregate size for A1 and A8.

By forming hydrogen bonds between A8s and adding one more interactive force compared to A7, A8 reaches the peak of 20 maximum aggregate size early in the simulation and remains constant during the rest of the trajectory (FIG. 6). Based on different aggregation behavior, asphaltene molecules were categorized to three categories of: non-aggregating (AP<1.30), mildly-aggregating (1.30<AP<2.00) and readily-aggregating (AP>2.00). For example, A1 and A2 with AP value of 1.26 and 1.28 respectively fall into the category of non-aggregating asphaltenes. FIG. 6 shows aggregation behavior of A1 with an average value of maximum aggregate size at 5. A1 and A2 do not make large aggregates.

Figure 7:
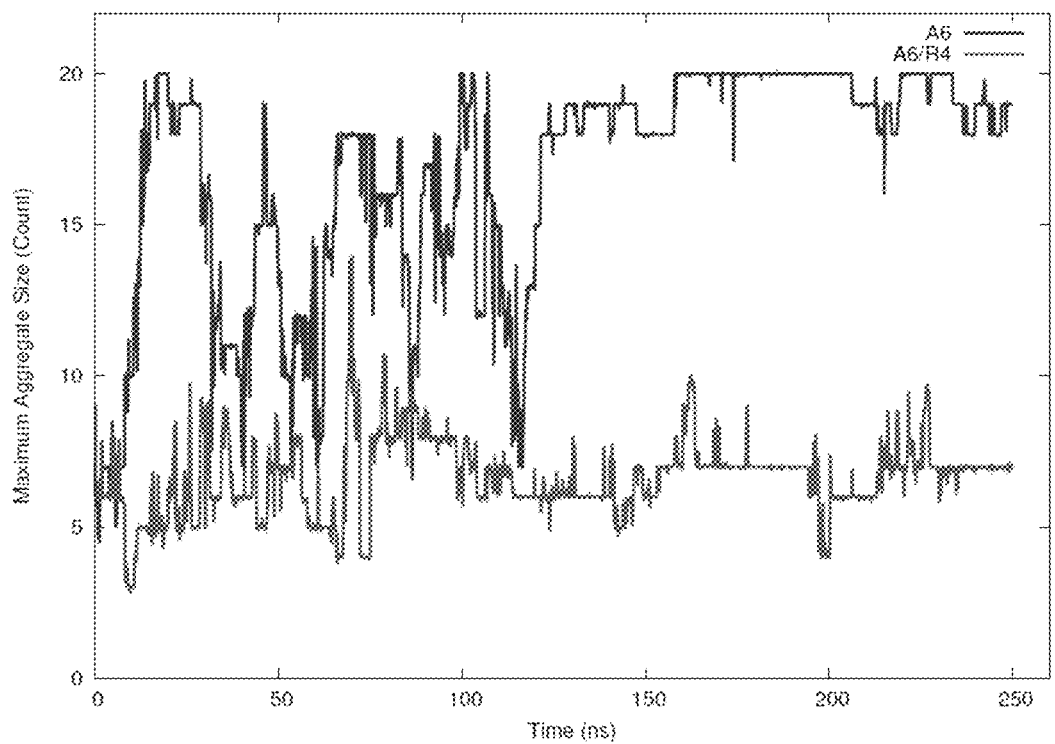
FIG. 7 is a plot showing the maximum aggregate size of neat A6 and A6 in presence R4.

On the other hand, A6, and A8 belong to the category of readily aggregating asphaltenes which can make large and stable aggregates with an aggregate size of equal to the total number of asphaltene molecules in the system. In some cases such as A8, the aggregate is so stable that maximum aggregate size remains constant during the entire length of the simulation (FIG. 6-7).

Figure 9:
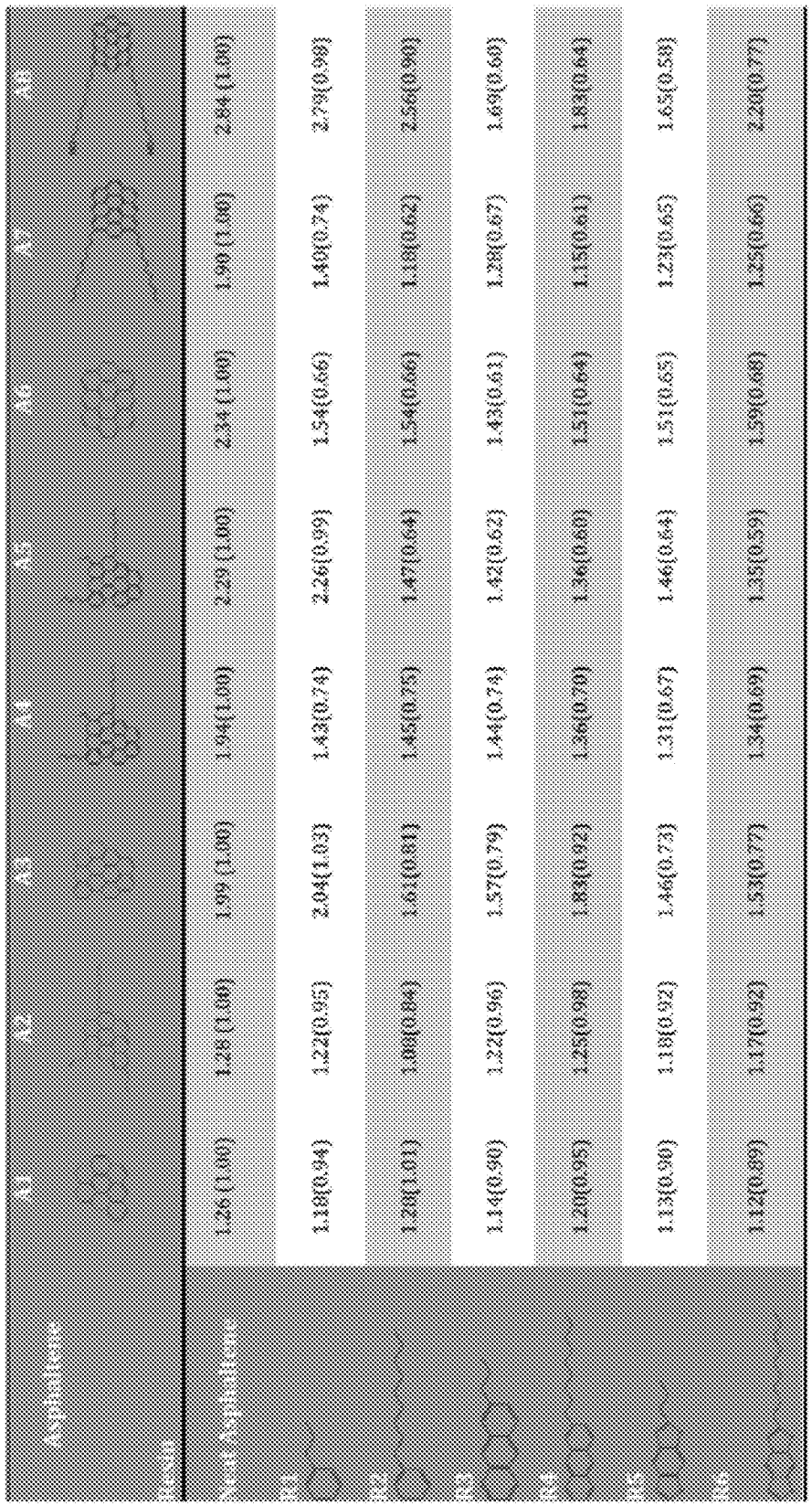
FIG. 9 is a plot showing the AP values for each simulation system. The ratio of the AP value in presence of the resin to the AP value in absence of resin is shown in parenthesis. Almost all the ratios are smaller than unity meaning resins deter aggregation. In general resins studied in this work deter aggregation of asphaltene in n-heptane.

Aggregation Behavior of Asphaltenes in the Presence of Resins. FIG. 9 shows the AP value for all eight types of asphaltene molecules in presence and absence of different resins. The value in parentheses is the ratio of the AP value in the presence of resin to that of the lack of resin. FIG. 9 demonstrates that the resins considered here either deter aggregation of asphaltenes or have no effect on its aggregation behavior. FIG. 7 shows aggregation behavior of A6 in absence and presence of R4.

A6 has an AP value of 2.34 and is categorized as readily-aggregating. Maximum aggregate size for this asphaltene reaches the peak of 20 molecules to make a single cluster. By adding R4, which is a resin with three fused benzene rings and a $C_9$ size aliphatic chain, AP value drops to 1.59 which is about 60% of the AP value for neat A6. In the presence of R4, A6 cluster size never reaches the peak value of 20. Similarly, A5 with AP value of 2.25 is among readily aggregating asphaltenes.

Figure 8:
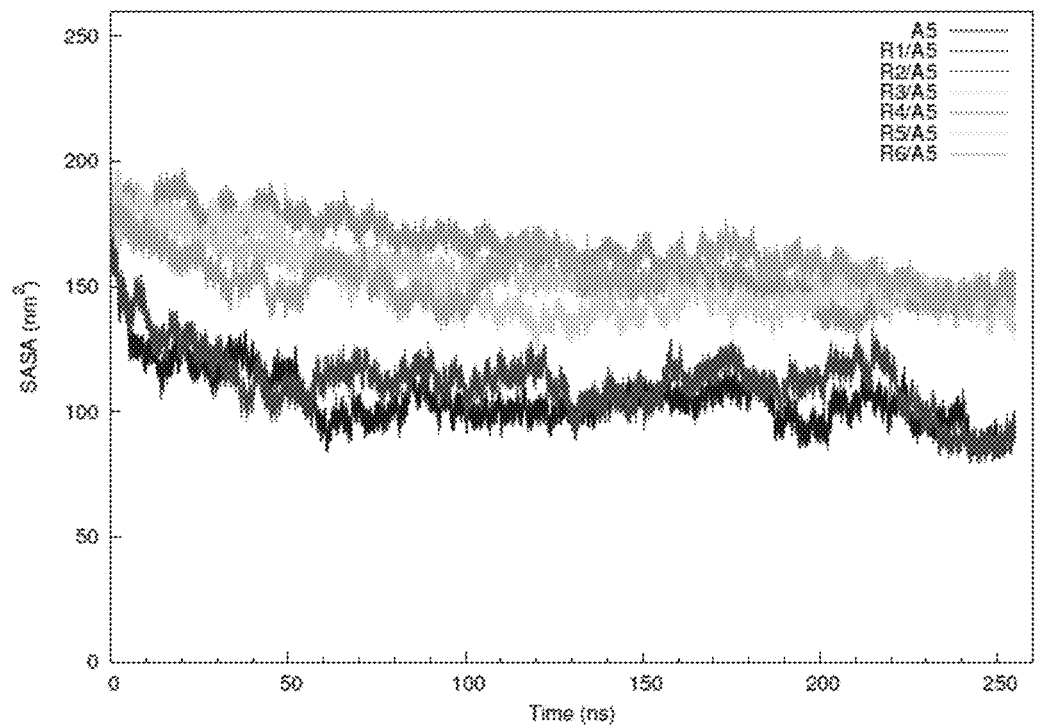
FIG. 8 is a plot showing the SASA value for A5 in presence and absence of different resins vs. simulation time. Resins other than R1 which has no effect on aggregation behavior of A5 deter its aggregation starting with various degrees but finally having the same quantitative deterring effect.

SASA value of A5 in the presence of resins demonstrates that R2-R6 have deterring effect on its aggregation. AP value of A5 in the presence of these resins drops below 1.45 which is about 60% of the AP value for neat A5. R1 practically does not affect aggregation behavior of A5. (FIG. 8)

Upon formation of asphaltene nanoaggregates, their diffusion becomes a kinetic barrier for their further aggregation. Resins interact with the surface of these nanoaggregates due to the similarity in their structure. Aromatic rings of resin interact with the aromatic core of asphaltenes and aliphatic chains with aliphatic chains. This way resins deter further aggregation of nanoaggregates. In the presence of most resins, maximum aggregation size of asphaltenes with a high AP value does not reach its peak of 20 because they stay in in the form of nanoaggregates Conclusions and Future Investigations Some asphaltenes aggregate and some do not aggregate. We categorized asphaltenes to three categories of non-aggregating, mildly aggregating and readily aggregating asphaltenes based on their aggregation propensity (AP) values. Most resins interrupt aggregation by various mechanisms depending on resin and asphaltene type. Using SASA and aggregation size analyses, we observe that resins prevent nanoaggregates from coming together and flocculation. The structure-specific details of such mechanism can be further investigated by pairing up more diverse types of resins with mildly-aggregating and readily-aggregating asphaltenes and study their molecular interactions More structure specific studies can be performed to link the correlation between deterring effect of resin and their structure. For example, it is important to understand how resins with hydrogen bonding capacity can affect aggregation propensity of asphaltenes with hydrogen bonding capability. Such resins may prevent flocculation of these asphaltenes. Furthermore, since aromatics such as toluene are a considerable portion of most crude, the effect of solvent type on aggregation behavior of asphaltenes can be evaluated through simulation of select asphaltenes from readily-aggregating asphaltenes in toluene and comparing them with n-heptane results. To further expand knowledge of the relative interaction of toluene and n-heptane with asphaltenes and resin, aggregation of a few select resins with highest deterring effect on readily aggregating asphaltenes in Heptol (a mixture of n-heptane and toluene) can be evaluated.

Example 2. Prediction of the Aggregation Behavior Via Molecular Features and Suggest the Best Resin to Interrupt Aggregation The molecular features of the asphaltenes can be linked to their aggregation propensity, which provides a decent predictive capacity. After knowing the molecular features of a sample of the crude oil, we can suggest the best resin to interrupt its aggregation. For instance, using only 6 parameters from 15 individual and coupled parameters of the asphaltene and resin molecules, we were able to predict the aggregation propensity of the asphaltenes in the presence of resin. If in a crude oil sample, the molecular features of the asphaltene are known, we can predict its AP value and can suggest the best resin with specific molecular features to prevent its aggregation. In case of the mix of asphaltenes, since based on the AP table (FIG. 9) the resins that can interrupt aggregation of asphaltenes with higher AP interrupt aggregation of asphaltenes with lower AP values, we always target asphaltenes with highest AP value.

As an example, a linear fit using only 6 parameters (in an attempt to keep the model as simple as possible) was performed as detailed below.

Figure 10:
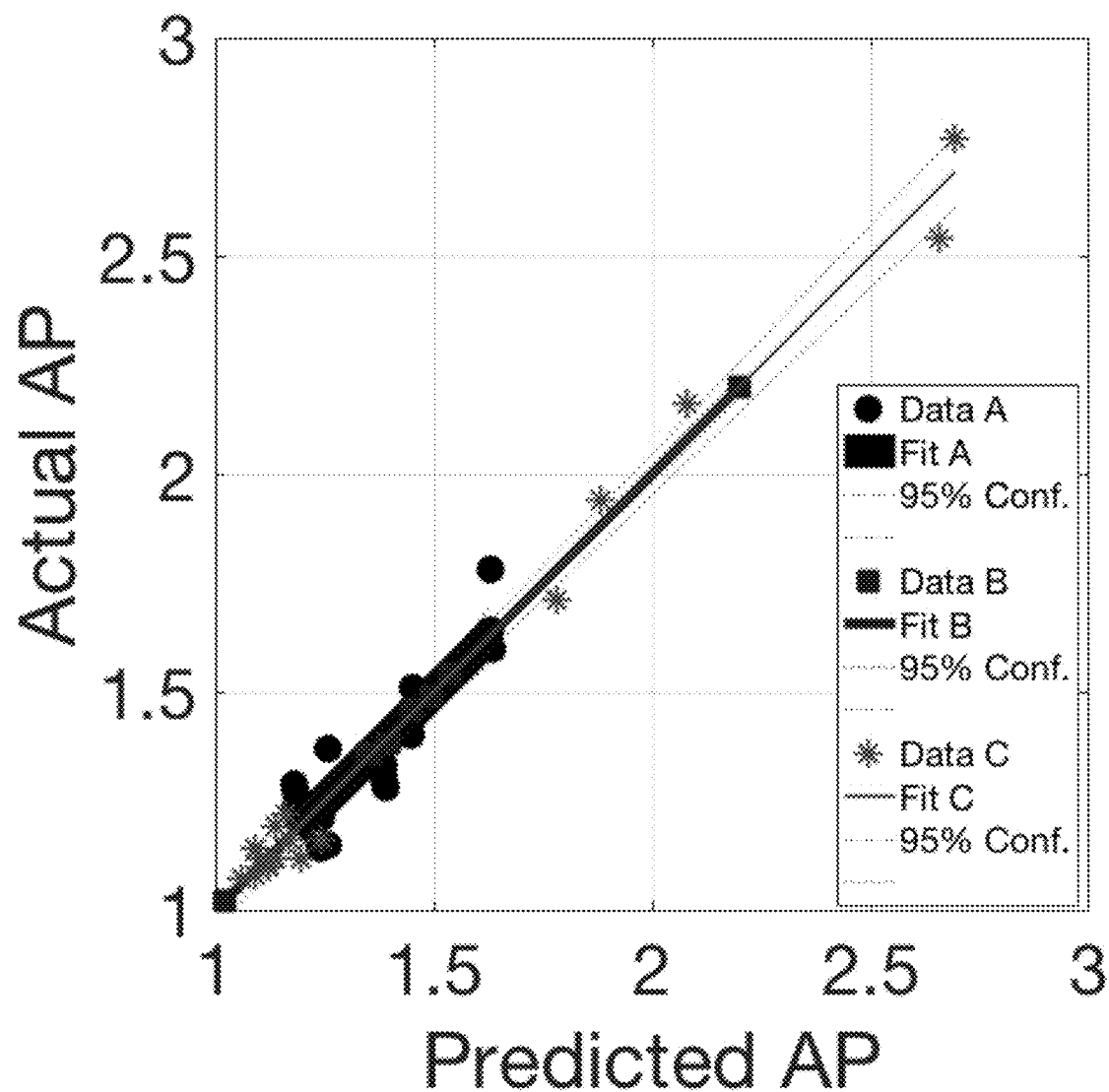
FIG. 10 is a plot showing the results of a linear regression analysis used to predict aggregation propensity from a set of molecular features of the asphaltene and aggregation inhibitor (resin).

Linear Regression in Presence of Resin:

$$AP = C_0 + C_1 * Het_a + C_2 * Ar_a * C_3 * Al_a + C_4 * Het_r + C_5 * Ar_r + C_6 * Al_r$$

where:
- $Het_a$: Number of heteroatoms in asphaltene;
- $Ar_a$: Number of aromatic fused rings in asphaltene;
- $Al_a$: Number of aliphatic carbons in asphaltene;
- $Het_r$: Number of heteroatoms in resin;
- $Ar_a$: Number of aromatic fused rings in resin; and
- $Al_a$: Number of aliphatic carbons in resin The results are shown in FIG. 10.

This strategy can be used to predict an AP for neat asphaltenes. Further, one could select a resin suitable for interrupting aggregation of a target asphaltene based on the ability of the resin to interrupt aggregation of asphaltene with similar AP and molecular features (e.g., as judged by from AP table).

We also investigated the aggregation behavior of asphaltenes in comparison to an isodesmic model in which the addition of each monomer to the cluster has the same K value. In other words, the free energy of dimerization is the same as the free energy of trimerization and so on. We found that some of the systems follow the isodesmic model, and some do not. Using this and fitting aggregate number distribution with an equation that we have derived based on the isodesmic model, we can estimate dimerization free energy in the presence and absence of resin. Hence, having dimerization energy, we can predict the aggregation propensity of the asphaltene. We are working on the model to see why some of the systems do not obey the isodesmic model. They are potentially obeying the cooperative aggregation.

The equation for the isodesmic fit is as follows.

$$\langle N_n \rangle = \frac{\sum_{Partitions} N_n e^{N_{clu} \frac{A_d}{T}}}{\sum_{Partitions} e^{N_{clu} \frac{A_d}{T}}}$$

$A_d$: Free energy of dimerization

Partitions: All the partitions of total number of initial monomers (20 for this case)

Figure 11A:
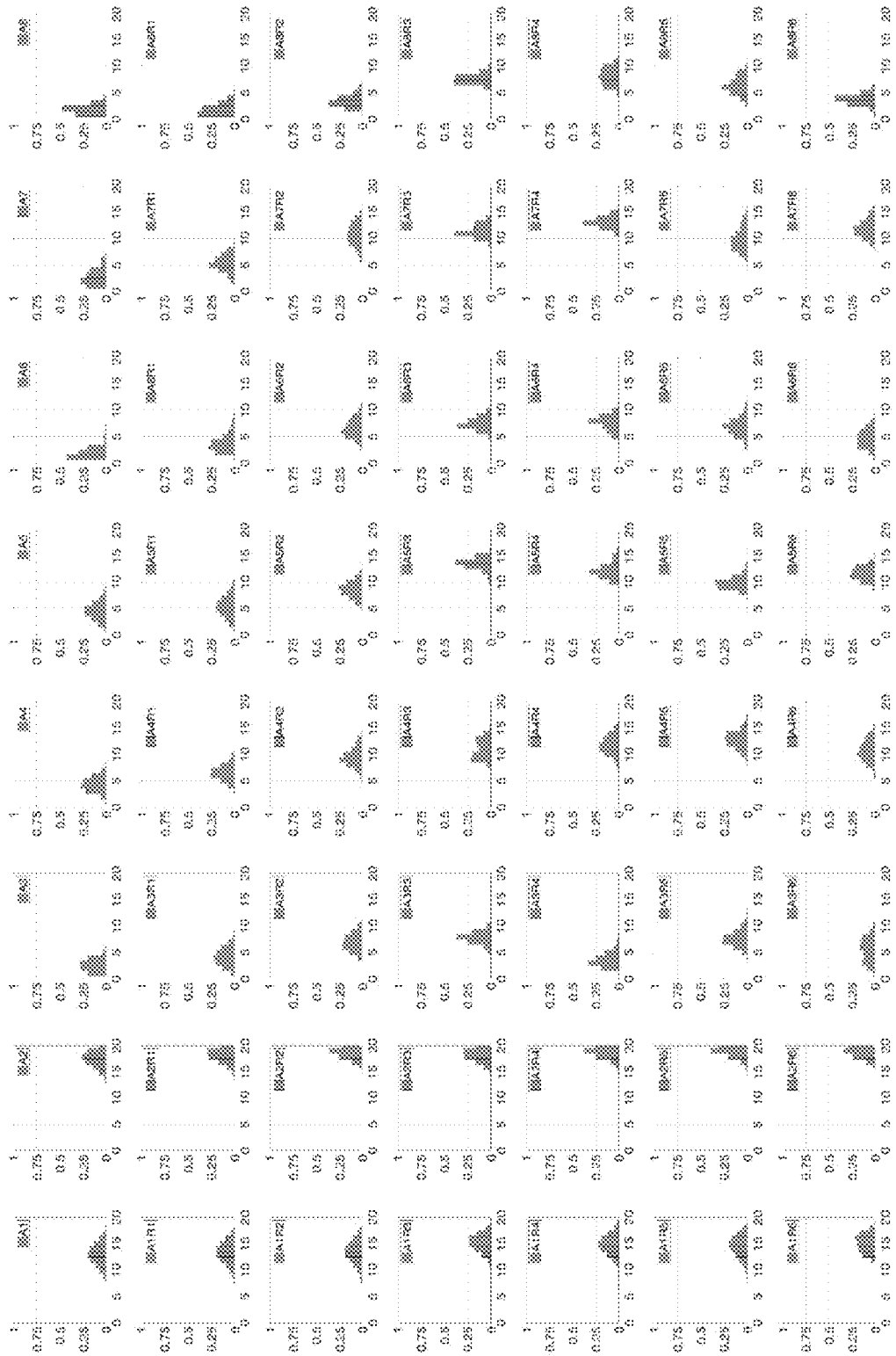
FIG. 11A shows the aggregation number distribution of all 56 systems.
Figure 11B:
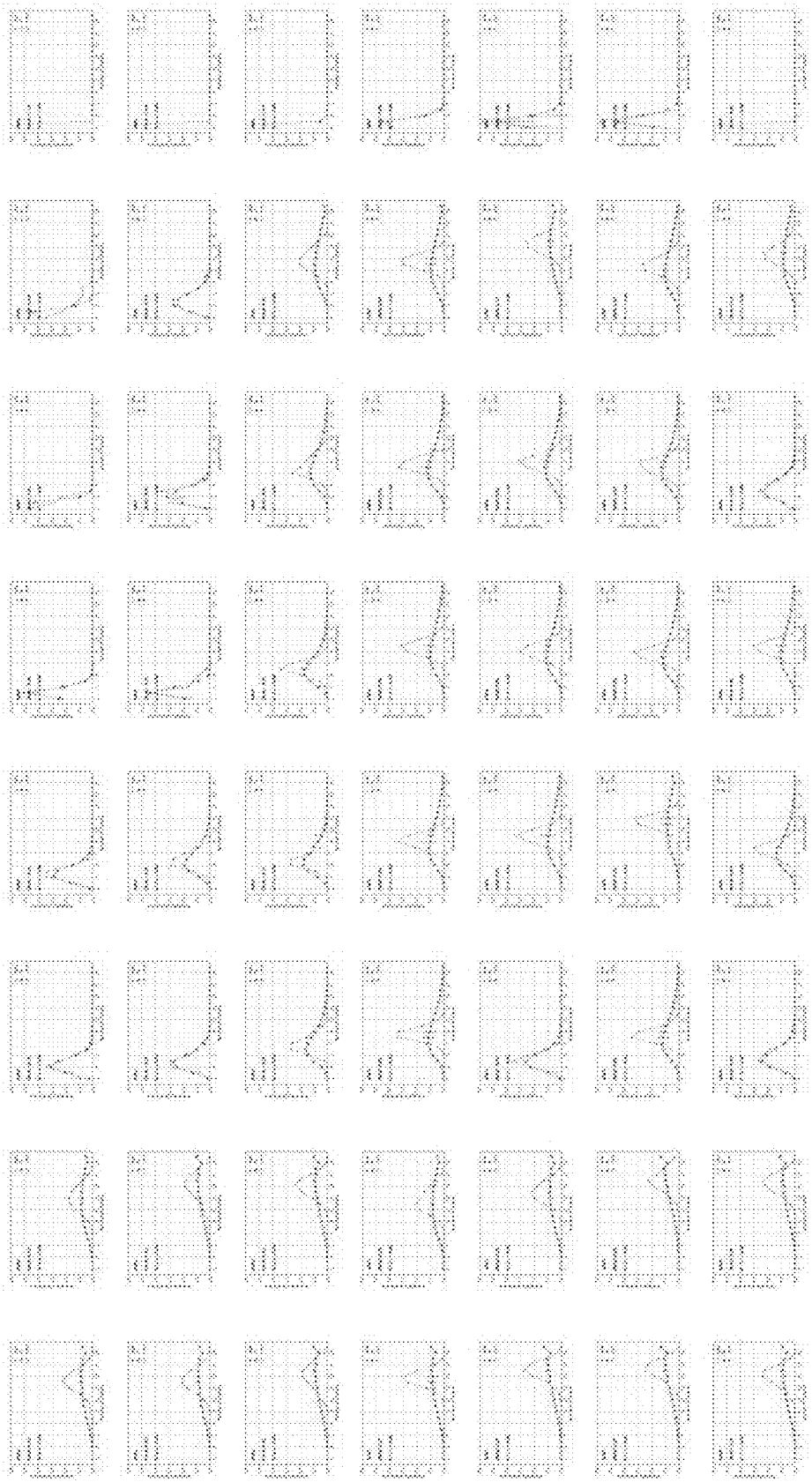
FIG. 11B shows the isodesmic distribution fit of all 56 systems.

$N_n$: The number of clusters of size $n$ $N_{clu}$: Number of cluster $T$: Temperature FIG. 11A shows the aggregation number distribution of all 56 systems. FIG. 11B shows the isodesmic distribution fit.

Example 3. Deterring Effect of Resins on the Aggregation of Asphaltene in n-Heptane Asphaltene precipitation can cause clogged pipelines the alleviation of which costs the oil industry billions of dollars per year. Asphaltenes are diverse set of macromolecules native to crude oil and are classified by their lack of solubility in light alkanes. The diverse set of molecular features of asphaltenes leads to a diverse set of precipitation criteria. Resins are another native component of crude oil that have been implicated in both deterring and promoting asphaltene aggregation. Here, a systematic set of model asphaltenes and resins were used to investigate the molecular features that affect the initial stages of asphaltene precipitation. Extensive all-atom molecular dynamics simulations were used to quantify aggregation behavior based on the isodesmic aggregation free energy of each system. These free energies were then fit to a linear model based on asphaltene and resin molecular features. All model resins tested in this example either deterred or did not affect asphaltene aggregation in a light crude environment. The inclusion of heteroatoms (0.22 kcal/mol/atom) and aromatic carbon atoms (0.06 kcal/mol/atom) in resins had the largest deterring effect on asphaltene precipitation. These findings and models represent a possible framework for utilizing select resins to prevent asphaltene precipitation.

Introduction

The precipitation of asphaltenes from crude oil can lead to clogged wellbores and pipelines the alleviation of which costs the oil industry billions of dollars per year. Precipitation occurs as a result of pressure change, temperature change and specific chemical composition of the crude oil. Crude is a complex mixture of four main classes of molecules: saturates, aromatics, resins and asphaltenes. Crude oils are classified as light to heavy depending on the amount of saturates (light) vs asphaltenes (heavy) present. Light crude has the most significant asphaltene precipitation problem due to the low solubility of asphaltenes in saturates. Resins are amphiphiles present in both heavy and light crude that have been implicated in preventing and aiding in asphaltene precipitation. It is thus of great interest to understand asphaltene precipitation and the role of resins in the process to predict and alleviate asphaltene precipitation problems.

Asphaltenes are the heaviest native component of crude oil and are classified by a solubility regime: they are insoluble in light alkanes and soluble in aromatic hydrocarbons. This classification leads to a diverse set of chemical structures with an average molecular weight of 750 Da (range of 400-1000). The modified Yen model of asphaltenes narrowed the structural scope of these molecules to be a core of 4-10 fused aromatic rings and peripheral hydrocarbon tails. Much of the research leading up to this structural description has been done using techniques such as time-resolved fluorescence correlation spectroscopy, nuclear magnetic resonance, laser desorption mass spectrometry, and small-angle neutron (SANS) and x-ray (SAXS) scattering. The results from these techniques have opened doors to the use of more structurally specific techniques including molecular dynamics.

Asphaltene precipitation is thought to follow the Yen-Mullins mechanism in which initial, pi-pi stacked nanoaggregates are formed followed by subsequent clustering, flocculation and ultimately precipitation. The Yen-Mullins model, however, does not directly address the role of resins in asphaltene precipitation from atomistic perspective. In this example, we focus on asphaltene molecules' propensity to form initial $\pi$-$\pi$ stacked nanoaggregates in a saturate abundant light crude environment, which is represented by n-heptane. We introduce a variety of resins to test their ability to deter the initial stages of asphaltene precipitation.

The role that resins play in the precipitation of asphaltenes is still debated; these molecules have been implicated in both preventing and aiding in asphaltene precipitation. Resins are native to crude oil and are defined as the most polar aromatic species in deasphalted oil. Although resins are smaller than asphaltenes, resins and asphaltenes both derive from coke and thus contain similar molecular features. The effect of resins on asphaltene aggregation has been studied by SANS, dynamic light scattering, and microscopy in addition to molecular mechanics. For instance, it has been reported that resins extracted from one type of crude oil with low tendency to form an aggregate decrease amount of aggregation if added to another type of crude with a high tendency to form aggregates. Similar studies suggest that type of resins with specific molecular features and their intermolecular interactions with asphaltenes play a key role in affecting aggregation behavior of asphaltene molecules. Despite these studies, the thermodynamics of asphaltene-resin interactions and the structure of these aggregates is still poorly understood.

Molecular dynamics (MD) is a powerful tool that has been used to gain insight into a wide variety of processes including the assembly of asphaltenes. Early MD studies focused on the association of asphaltenes in vacuum or implicit solvents. More recently, studies have looked at asphaltene assembly in solvents including the computation of thermodynamic properties of asphaltene association. An explicit representation of solvent is important to accurately capture the behavior of molecules in their solvated environment. To date, there has not been a large-scale systematic MD study of asphaltene aggregation and the role that resins play in this process.

It is hypothesized that the large variability in the molecular structure of asphaltenes and resins causes the conflicting behavior observed for asphaltene-resin precipitation. A systematic all-atom explicit solvent MD study is described that tested this hypothesis. Specifically, we (1) designed a set of model asphaltene-like and resin-like molecules to probe the role of specific molecular features, (2) determined aggregation classes of neat asphaltenes in light crude and (3) determined classes of asphaltene aggregation inhibition by resins.

Figure 12A:
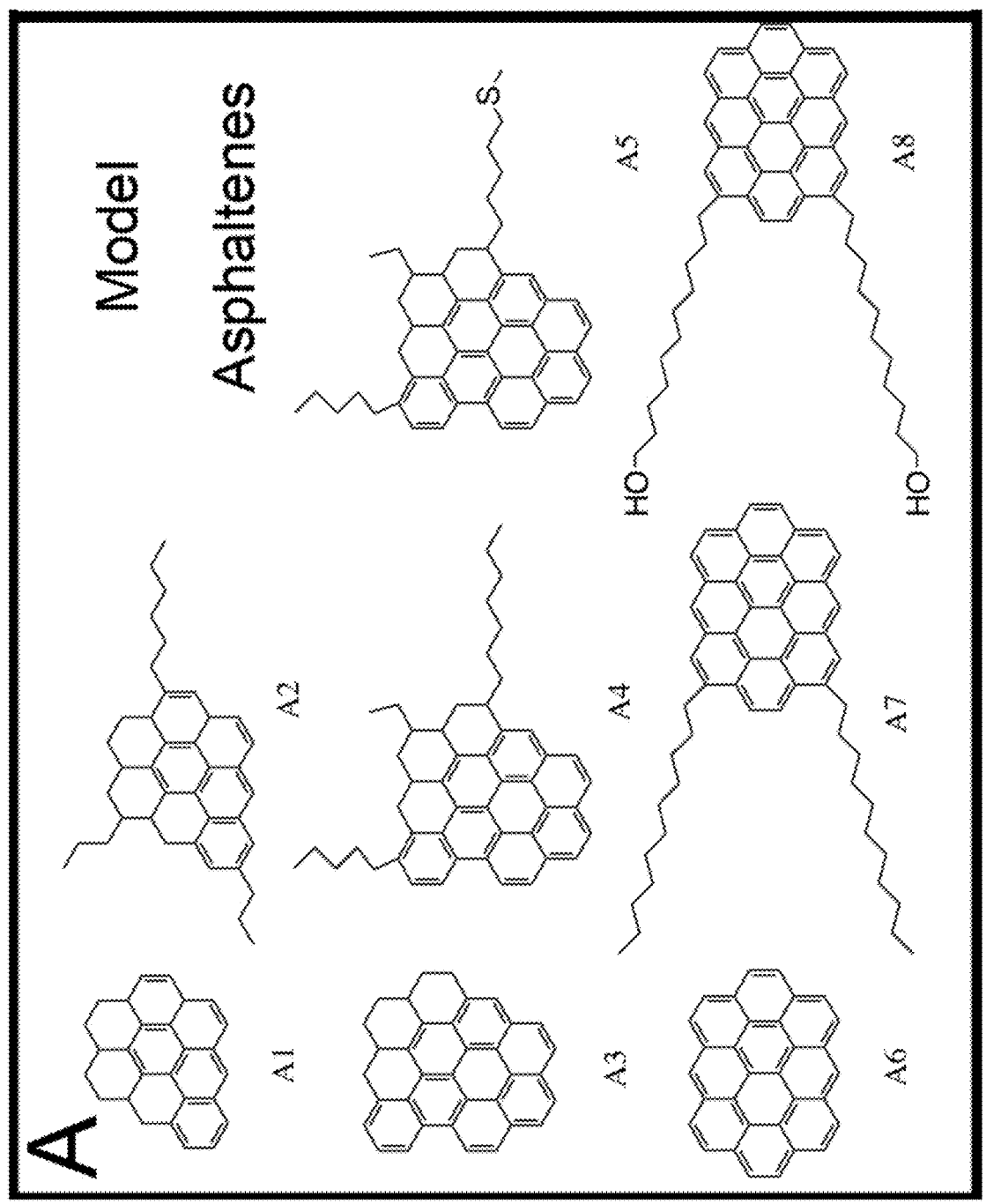
FIGS. 12A-12B illustrate the eight model asphaltenes (FIG. 12A) and three model resins (FIG. 12B) used in Example 3. These sets were chosen to systematically test the effect of size of aromatic core, presence of heteroatoms and presence of aliphatic groups for both asphaltenes and resins on the aggregation propensity of the asphaltene.
Figure 12B:
Figure 12B:
Figure 12B:
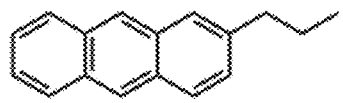
Figure 12B:
Figure 12B:
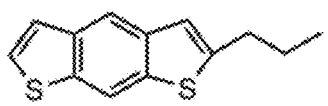
Figure 12B:

Methods Choice of Model Asphaltenes and Resins. Shown in FIG. 12A, a set of representative model asphaltene molecules (A1-A8) was chosen for this study. The core size of the model asphaltene molecules here are composed of 4-10 aromatic benzene fused rings. We note that not all of these model asphaltenes conform to the C/H criteria for asphaltenes rather the set was chosen to systematically test certain molecular features. A set of model resin molecules (R1-R6) was also chosen for a systematic study of the effect of resins on the aggregation of asphaltene molecules (FIG. 12B). Both model asphaltene and resin molecules differ in size of aromatic core, presence and length of aliphatic chain, and presence of heteroatom(s).

Force Field Verification. OPLS-AA was chosen as the force field for all simulations. This force field can reproduce physical properties of organic molecules and in particular aromatic molecules. Furthermore, an asphaltene model molecule, Violanthrone-79, can be parameterized with OPLS-AA force field and simulated in chloroform and toluene. AS an example, orientational analysis of the Violanthrone-79 simulation replicates antiparallel dimer structure supported by 2D-IR results. It has been determined that the stacking geometry of Violanthrone-79 at formed nanoaggregates have strictly antiparallel stacking behavior with a twist angle of 180±23, which is in a good agreement with our molecular dynamics (MD) results.

Simulation Procedure. All of the individual asphaltene and resin structures were built in GaussView V.5.0. Gaussian09 was used to geometry-optimize all structures. The B3LYP exchange-correlation functional and basis set of 6-31+G(d) were used. The restricted electrostatic potential (RESP) procedure was utilized to find partial charges on individual atoms of each structure. The GROMACS package (version 5.0.4) was utilized for all molecular dynamics (MD) simulations. The VMD package was used for visualization of all trajectories.

In each of the fifty-six systems, 20 asphaltene molecules were randomly dispersed in a box with explicit n-heptane. The concentration of asphaltene in each system was 0.1 M. To investigate the effect of resins on the aggregation behavior of asphaltenes, each type of resin was paired with each type of asphaltene. A typical resin to asphaltene mass ratio in a medium crude is about five, which was used in all paired systems.

Nose-Hoover and Parrinello-Rahman algorithms were used to keep average temperature and pressure constant at 300K and 1 bar. Cubic periodic boundary conditions were applied to the systems to simulate infinite bulk behavior. For all systems the integration time step was 2 fs with a write frequency of 2 ps. Long-range electrostatic interactions were treated by Particle Mesh Ewald (PME). The initial configuration of each system was energy minimized by using the steepest descent method to remove any existing high-energy structures. The minimization step was followed by 5 ns of equilibration and following that 250 ns of production run was performed for each system.

Data Analysis. Cluster size distributions were fit to the isodesmic model of aggregation. Within this model, it can be shown that the average number of clusters is given as $$\langle N_n \rangle = \frac{\sum_{Partitions} N_n e^{N_{clu} \frac{\Delta G_{iso}}{T}}}{\sum_{Partitions} e^{N_{clu} \frac{\Delta G_{iso}}{T}}}$$

where $\Delta G_{iso}$ is the isodesmic free energy of aggregation, $N_n$ is the number of clusters of size n, $N_{clu}$ is the number of aggregates and T is temperature.

To calculate the number of aggregates in each time step, the pairwise atomic distance between heavy atoms of model asphaltenes was measured. A cutoff distance of 0.37 nm was used to include both face-to-face π-π stacks as well as edge-to-edge aggregates. The probability distribution of the number of aggregates was computed by normalized histograming of the number of aggregates in each time step over last 60 ns of the trajectory.

Results and Discussion

Aggregation Behavior of Neat Model Asphaltenes. Larger, aromatic asphaltenes readily aggregate in light crude; however, the contribution to aggregation free energy from different molecular features are unknown. The set of model asphaltenes depicted in FIG. 12A was chosen to systematically probe the role of certain molecular features on the aggregation propensity of the model asphaltene. Namely, the role of aromatic core size, inclusion of aliphatic tails and the inclusion of heteroatoms on the aggregation of model asphaltenes was investigated.

Three Aggregation Classes. Aggregation of the eight model asphaltenes in n-heptane can be classified into three categories: non-aggregating, mildly-aggregating and readily-aggregating. Aggregation was monitored in all-atom molecular dynamics simulations of each model asphaltene at a concentration of 0.1 M solvated in n-heptane. Aggregate size distributions were measured as described in the methods above, and these were then fit to the isodesmic model. The single fit parameter in this procedure is the isodesmic aggregation free energy, $\Delta G_{iso}$. The results from this procedure are provided in FIG. 13A in descending order of $\Delta G_{iso}$. Non-aggregating asphaltenes ($\Delta G_{iso}$>0) include A1 and A2, indicating that these model asphaltenes are effectively solvated by n-heptane. Mildly-aggregating asphaltenes include A3, A4 and A7 with criteria 0>$\Delta G_{iso}$>−1.5 kcal/mol indicating mild attraction between asphaltenes. Readily-aggregating asphaltenes include A5, A6 and A8 with $\Delta G_{iso}$<=−1.5 kcal/mol indicating large attractive interactions and thus a strong propensity to aggregate.

Non-aggregating asphaltenes are characterized by small aromatic cores and a lack of heteroatoms. $\Delta G_{iso}$=0.187±0.003 kcal/mol for A1 and $\Delta G_{iso}$=0.15±0.01 for A2 indicate an effective solvation of these asphaltenes in n-heptane. This effective solvation can also be observed in a representative snapshot near the end of the simulation of A1 in FIG. 13B. The lack of any type of stable aggregate is characteristic of both A1 and A2 and suggests that the dominant species is the monomer. Aggregates such as dimers and trimers are observed but only transiently. Model asphaltenes A1 and A2 have small aromatic cores (five fused benzene rings) and no heteroatoms. Thus, we can conclude that the presence of a small aromatic core is insufficient to cause precipitation of asphaltenes in light crude.

Figure 13C:
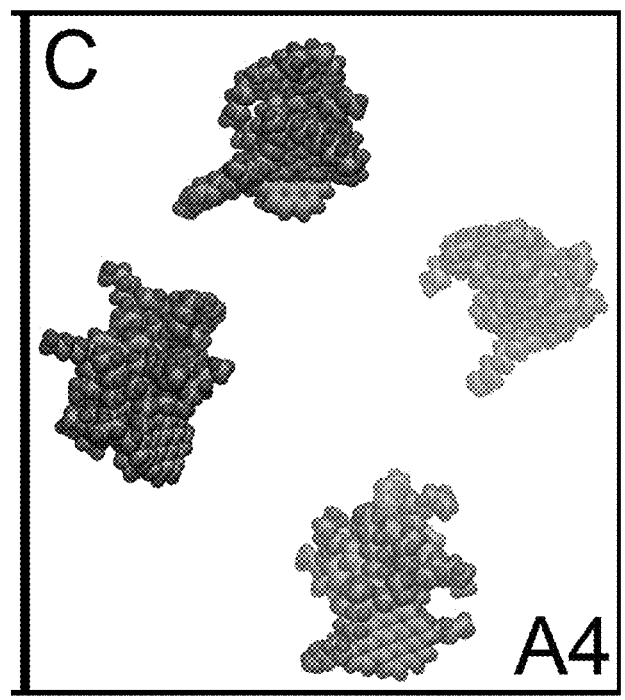

Mildly-aggregating asphaltenes are characterized by medium to large aromatic cores and a lack of heteroatoms. Species A3, A4 and A7 have 0>$\Delta G_{iso}$>−1.5 kcal/mol which is achieved by forming long-lived aggregates of 4-5 asphaltenes. A representative snapshot from the simulation of A4 demonstrating such a set of clusters is depicted in FIG. 13C. The smaller aggregates form but never fuse together to form larger stable aggregates. Model asphaltenes A3 and A4 have fused aromatic cores of eight benzene rings. The addition of three fused benzene rings convert A1 to A3 and lead to a dramatic increase in the aggregation behavior of A3 as compared to A1. The addition of aliphatic tails to A3 yields A4 and leads to an increase in $\Delta G_{iso}$ from −1.0±0.2 kcal/mol for A3 to −0.5±0.1 kcal/mol for A4. Interestingly, increasing the fused aromatic core to 10 rings (A6, A7, A8) leads to increased aggregation behavior but this can be decreased by again adding aliphatic chains (A7) to make the asphaltene more soluble in n-heptane. Overall, mildly-aggregating asphaltenes form clusters of 4-5 asphaltene molecules that, under the simulation conditions tested here, do not further aggregate.

Figure 13D:
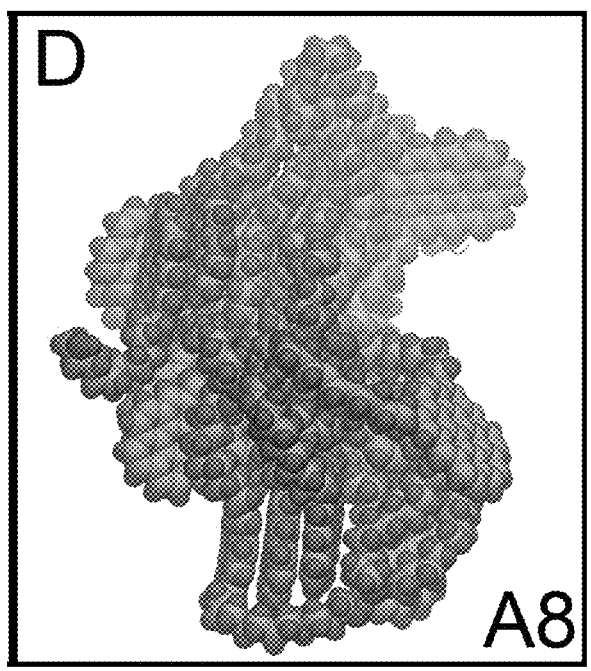

Readily-aggregating asphaltenes are characterized by large aromatic cores and/or inclusion of heteroatoms. Species A5, A6 and A8 all have $\Delta G_{iso}$<−1.5 kcal/mol indicating a strong effective attraction between asphaltene molecules. This strong effective attraction leads to the formation of a single aggregate in our simulation of 20 molecules as depicted for A8 in FIG. 13D. A5 has an aromatic core identical to A3 and A4 which would place it in the mildly-aggregating category but the addition of a single heteroatom (sulfur) increase the aggregation propensity of this model asphaltene. A6 and A8 both have the ovalene fused aromatic core (10 rings) and readily aggregate because of it. The aliphatic chains of A8 are capped with alcohol groups, which lead to extreme aggregation due to both solvophobic and hydrogen-bonding behaviors. Since these aggregates are composed of all 20 molecules in our simulation box, we only say they are the nanoaggregates in the first step of the Yen-Mullins precipitation mechanism. However, this is the maximum possible size of aggregate observed due to system size constraints.

Figures 14A, 14B:
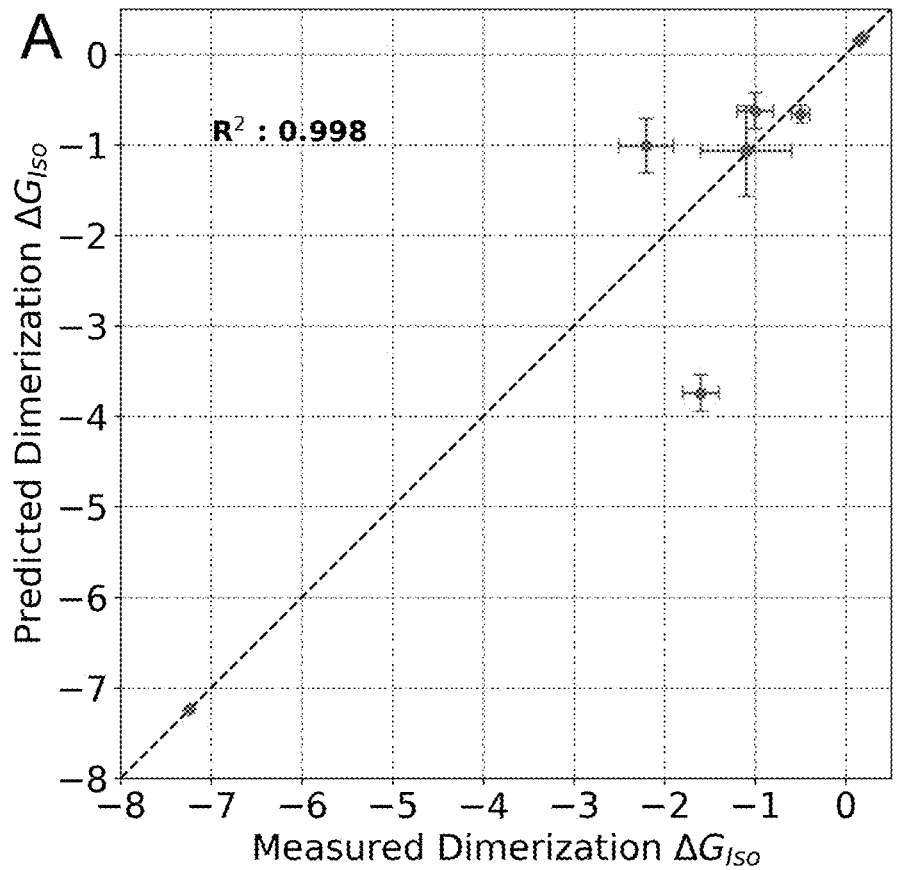
FIGS. 14A-14B illustrate the linear regression for $\Delta G_{iso}$ to asphaltene molecular features.

Molecular Features Predict Aggregation Behavior. The behavior of different molecular features such as size of aromatic core, presence of heteroatoms and presence of aliphatic tails distinguish the aggregation classes discussed in the previous section. This behavior was quantified by fitting the $\Delta G_{iso}$ values of the eight neat asphaltenes to a linear equation with respect to number of heteroatoms ($N_{A_h}$), number of aromatic carbons ($N_{A_{ar}}$), and number of aliphatic carbons ($N_{A_{al}}$), $$\Delta G_{iso} = A_h N_{A_h} + A_{ar} N_{A_{ar}} + A_{al} N_{A_{al}} + C$$

where $A_h$ represents the contribution to $\Delta G_{iso}$ per heteroatom, $A_{ar}$ represents the contribution to $\Delta G_{iso}$ per aromatic carbon, $A_{al}$ represents the contribution to $\Delta G_{iso}$ per aliphatic carbon and C the offset in $\Delta G_{iso}$. The results of the linear regression to determine A coefficients are presented in FIGS. 14A-14B. A weighted regression and correlation coefficient evaluation was performed in order to account for error in the measured values.

Molecular features of asphaltenes can be used to predict their aggregation behavior in n-heptane. The correlation coefficient of $R^2=0.998$ demonstrates that strong linear behavior of $\Delta G_{iso}$ with respect to molecular features in n-heptane. The values of the A coefficients suggest that the presence of a heteroatom has the largest per-atom effect on $\Delta G_{iso}$ as each heteroatom contributes –3.1 kcal/mol towards the binding free energy. This is mainly due to the extremely large negative $\Delta G_{iso}$ observed for A8. Aromatic carbons contribute –0.10 kcal/mol towards aggregation behavior. Addition of a fused aromatic ring to an aromatic core will contribute an additional 3-4 aromatic carbons thus contribute –0.30 –0.40 kcal/mol towards aggregation behavior. Interestingly, addition of aliphatic carbons is found to have a negligible effect on isodesmic free energy of aggregation (–0.002±0.005 kcal/mol/atom).

Aggregation Behavior of Model Asphaltenes in the Presence of Model Resins. The role that resins play in the aggregation of asphaltenes is debated. Here we investigated how a model set of resins affect the aggregation of our model set of asphaltenes. The aromatic core size, length of aliphatic chains and presence of heteroatoms are systematically varied in the set of model resins. We considered only the homo-aggregation of asphaltenes and the effect of a single type of resin. Resins are added in amounts to maintain a resin to asphaltene mass ratio of 5, which is typically found in medium crude.

Isodesmic Aggregation Free Energy for all Asphaltene-Resin Combinations. The isodesmic free energy of asphaltene aggregation can be used to assess the role of resins in promoting or preventing asphaltene aggregation. To measure this quantity, we again monitored the number of asphaltene clusters formed in our simulations using an asphaltene-asphaltene clustering procedure. The cluster distributions were then fit to an isodesmic aggregation model to obtain an effective aggregation free energy for the asphaltenes in the presence of resins. These values are presented for all asphaltene resin pairs studied here in Table 1.

TABLE 1

$\Delta G_{iso}$ in kcal/mol for asphaltene-resin mixtures in n-heptane computed using isodesmic fitting of cluster size distributions measured from all-atom molecular dynamics simulations. Error estimates provided in parentheses are estimated from three separate 20 ns chunks of simulations.

| R/A | A1 | A2 | A3 | A4 | A5 | A6 | A7 | A8 |
|---|---|---|---|---|---|---|---|---|
| NR | 0.187(3) | 0.15(1) | −1.0(2) | −0.5(1) | −1.6(2) | −2.2(3) | −1.1(5) | −7.239(1) |
| R1 | 0.20(1) | 0.20(1) | −0.54(1) | −0.191(4) | −0.9(3) | −0.73(3) | −0.5609(4) | −4.9(4) |
| R2 | 0.21(1) | 0.21(3) | −0.07(2) | −0.1(1) | −0.11(4) | −0.02(1) | 0.08(1) | −3.0(4) |
| R3 | 0.20(1) | 0.17(2) | 0.04(1) | 0.047(4) | 0.08(1) | 0.012(2) | 0.08(1) | −1.5(1) |
| R4 | 0.242(1) | 0.20(1) | −0.36(9) | 0.08(1) | 0.03(1) | 0.05(2) | 0.176(2) | −1.404(1) |
| R5 | 0.252(1) | 0.26(1) | −0.03(3) | 0.149(3) | 0.022(3) | −0.001(4) | 0.0(1) | −1.3(1) |
| R6 | 0.22(1) | 0.25(2) | −0.5(1) | −0.002(3) | 0.08(2) | −0.3(1) | 0.14(1) | −5.4(1) |

All model resins either deter or have little effect on the aggregation of all model asphaltenes studied here. The isodesmic aggregation free energy of all asphaltene-resin mixtures tabulated in Table 1 are greater than the respective neat asphaltene (NR) value. Thus, resins are preventing aggregation of the asphaltene molecules. This is due to the fact that even the base resin, R1, has an aromatic component that is not present in the solvent. Thus, the resins will be attracted to the asphaltenes. The specific behavior of asphaltenes and resins are broken up into the asphaltene aggregation groups discussed in the previous section.

Resins do not affect the aggregation propensity of non-aggregating asphaltenes. While both A1 and A2, the non-aggregating asphaltenes, demonstrate slight increases in $\Delta G_{iso}$ in the presence of resins (Table 1), the increases are small and some are within error of the neat asphaltene values. Model asphaltenes A1 and A2 do not aggregate in n-heptane and none of the model resins we investigated cause them to aggregate.

Resins prevent the aggregation behavior of mildly-aggregating asphaltenes. Focusing on A3, A4 and A7, we observe a mild effect on the isodesmic binding free energy due to the presence of R1. This resin is small and has little measurable effect on the aggregation of any model asphaltene tested. The remaining resins significantly increase the solubility of the mildly aggregating asphaltenes. The lone exception is A3/R6 in which we see a muted effect similar to A3/R1. In the rest of the cases, the resins interact with the asphaltenes to help solubilize them in n-heptane leading to an increase in the $\Delta G_{iso}$ values for these mixtures as compared to the corresponding neat asphaltene. For A3, A3/R3 has largest effect; R3 has similar molecular features to A3: large aromatic core and small aliphatic tails. For A4, any resin with more than one aromatic ring solubilizes this asphaltene. For A7, even R2, with a small aromatic core but large aliphatic tail, solubilizes this asphaltene. It is possible to tune the resin to best suit the asphaltene but, in general, resins stop the aggregation of mildly aggregating asphaltenes.

The aggregation of asphaltenes designated as readily aggregating (A5, A6 and A8) is deterred by the presence of resins. Again, all values of $\Delta G_{iso}$ for A5, A6 and A8 in the presence of resins are larger than the corresponding neat value (Table 1). Exactly how deterred this behavior is depends on the asphaltene. A5 and A6 are readily converted into non-aggregating or mildly-aggregating by any resin other than R1. A8, on the other hand, has $\Delta G_{iso}$ values below $-1.0$ kcal/mol in the presence of all resins. Thus, while resins do deter the aggregation of A8, they do not completely prevent it.

Figures 15A, 15B:
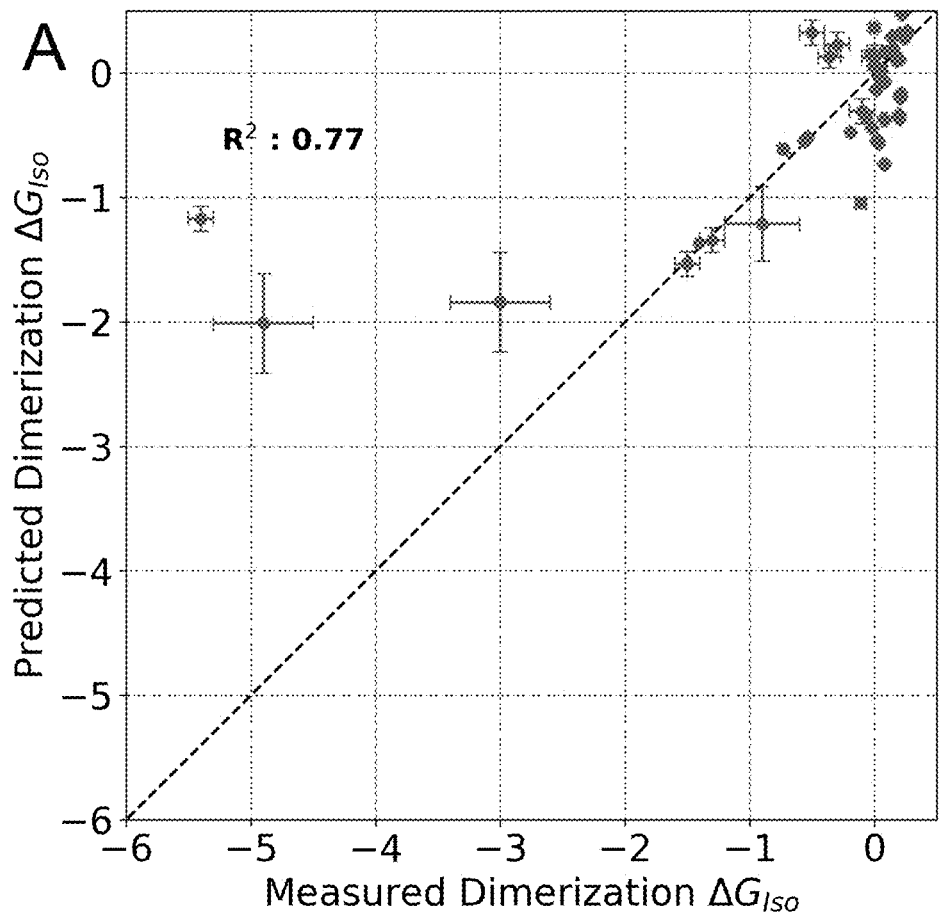
FIGS. 15A-15B illustrate the linear regression for $\Delta G_{iso}$ to asphaltene molecular features FIG. 16 illustrate the model asphaltenes and model resins used in Example 4.

Molecular Features Predict Aggregation Behavior. The molecular features of asphaltenes and resins can be used to estimate the aggregation propensity of a given asphaltene in the presence of a given resin. Following a procedure similar to the linear model for the neat asphaltenes, we considered six molecular features of a given system: number of heteroatoms in the asphaltene, number of aromatic carbon atoms in the asphaltene, number of aliphatic carbon atoms in the asphaltene, number of heteroatoms in the resin, number of aromatic carbon atoms in the resin and number of aliphatic carbon atoms in the resin. The isodesmic free energy of aggregation is then set equal to a linear function of these features as written out in FIG. 15B. A linear fitting procedure is followed inversely weighted by the error of the measured $\Delta G_{iso}$ values. The results are provided in FIGS. 15A-15B.

The asphaltene feature coefficients as expected are similar in the asphaltene-resin model and the neat asphaltene model. The most dominant component is the number of heteroatoms with an effective aggregation free energy of $-0.73$ kcal/mol/atom in the asphaltene-resin model. This is an increase as compared to the $-3.1$ kcal/mol/atom found in the neat asphaltene system indicating that resins, overall, reduce the effect of asphaltene heteroatoms on the aggregation of asphaltenes. The presence of aromatic carbon atoms in the asphaltenes also drive them to aggregate as is indicated by the $-0.018$ kcal/mol/atom found in this model. The presence of aliphatic carbon atoms on the resins has minimal effect.

All resin molecular features have a deterring effect on the aggregation of asphaltenes. The largest is the presence of heteroatoms in the resins, which provide an increase in $\Delta G_{iso}$ of 0.22 kcal/mol/atom. Aromatic carbon atoms on the resins provide 0.06 kcal/mol/atom increase in $\Delta G_{iso}$ of the asphaltene.

Conclusions. Asphaltene precipitation is an expensive problem for the oil industry. The molecular mechanisms behind this behavior remain enigmatic. In this manuscript we utilized large-scale all-atom molecular dynamics to investigate the molecular features of asphaltenes and resins that promote and deter asphaltene aggregation. Using an isodesmic fitting to our simulation data, the isodesmic free energy of aggregation was computed for all asphaltene systems. These results were then fit to linear models using asphaltene and resin molecular features. It was found that asphaltene heteroatom is the largest contributor to the aggregation propensity of asphaltenes in n-heptane.

Resins play a deterring role in asphaltene aggregation in n-heptane. The presence of heteroatoms and large aromatic cores of the resins, specifically significantly impact the resins ability to deter asphaltene aggregation.

The linear models built in this example represent possible predictive tools for asphaltene precipitation. One could envision using the coefficients here to compute the likeliness of asphaltenes observed in a particular well sample to precipitate. Additionally, one could predict the type of resin to best deter the precipitation process. Additional data is needed to see how transferable these models are to other types of crude and other asphaltene and resin systems.

Example 4. Molecular Dynamics Study of Clustering and Flocculation of Model Asphaltenes in n-Heptane and the Stabilizing Effect of Model Resin Asphaltenes are macromolecules known to be responsible to form deposition in extraction and transportation equipment in oil industry and imposes the cost of billions of dollars in cleaning expenses to the oil industry and in loss of production due to cleaning overhauls. We previously studied the effect of resins in nanoaggregation of asphaltene molecules. That study suggested that introducing resins with certain molecular characteristics to the solution of an aggregating asphaltene can deter the nanoaggregation of asphaltenes. Further study was conducted to ensure the deterring capability of resins in subsequent stages of aggregation namely clustering and flocculation. In this example, we studied the clustering and flocculation of a mildly-aggregating and two readily-aggregating asphaltenes and the deterring effect of a three member ring resin on the post nanoaggregation stages. Resins could potentially alleviates the asphaltene deposition problem if they are effective in deterring clustering and flocculation stages. We use explicit solvent molecular dynamics to gain atomistic resolution insight on clustering and flocculation of asphaltenes in both the presence and absence of resin Introduction Every year, billions of dollars are wasted globally in loss of production and cleaning of equipment expenses in petroleum industry. The cleaning of pipelines and oil wellbore is required due to the deposition of troublesome molecules called asphaltene, which is one a main component of the crude oil. Based on SARA fractionation method, crude oil contains saturates, aromatics, resins, and asphaltenes. Each type of crude oil contains a range of these named fractions. The ratio of resins and asphaltenes increase going from lighter toward heavier oil types. Asphaltenes are categorized as a solubility class of molecules and are considered toluene soluble and n-heptane insoluble. Thus, the most severe deposition happens in the presence of pure n-heptane or other n-heptane like saturates.

Based on Yen-Mullins model, aggregation of asphaltenes starts with nanoaggregation step in which approximately 5-7 asphaltene molecules stack and form a nano-sized aggregate. Approximate size of a nanoaggregate is about 2 nm. Further aggregation of asphaltenes leads to clustering where several nanoaggregates interact and form an aggregate of roughly 5 nm in diameter. Aggregation of asphaltene clusters is called flocculation that leads to macroscopic phase separation. Some experimental studies have shown that the size of aromatic core is important in the aggregation tendency of asphaltenes, which are validated by a number of computational studies. In our previous example, we further quantified this effect as well as the effect of other molecular features with two main metrics. Also, we investigated the role of six model resins in the nanoaggregation of eight model asphaltenes. With total of 56 simulation systems comprised of neat and paired resins, we showed that resins with three aromatic rings and resins with heteroatom such as sulfur effectively interrupt the nanoaggregation of mildly-aggregating as well as readily-aggregating model asphaltenes. However, the 20 count system size of asphaltene molecules was not suitable to study the clustering and flocculation steps.

Our work in this example shows in atomistic detail how a resin with three aromatic benzene fused rings prevents clustering and flocculation of asphaltene nanoaggregates.

Figure 16:
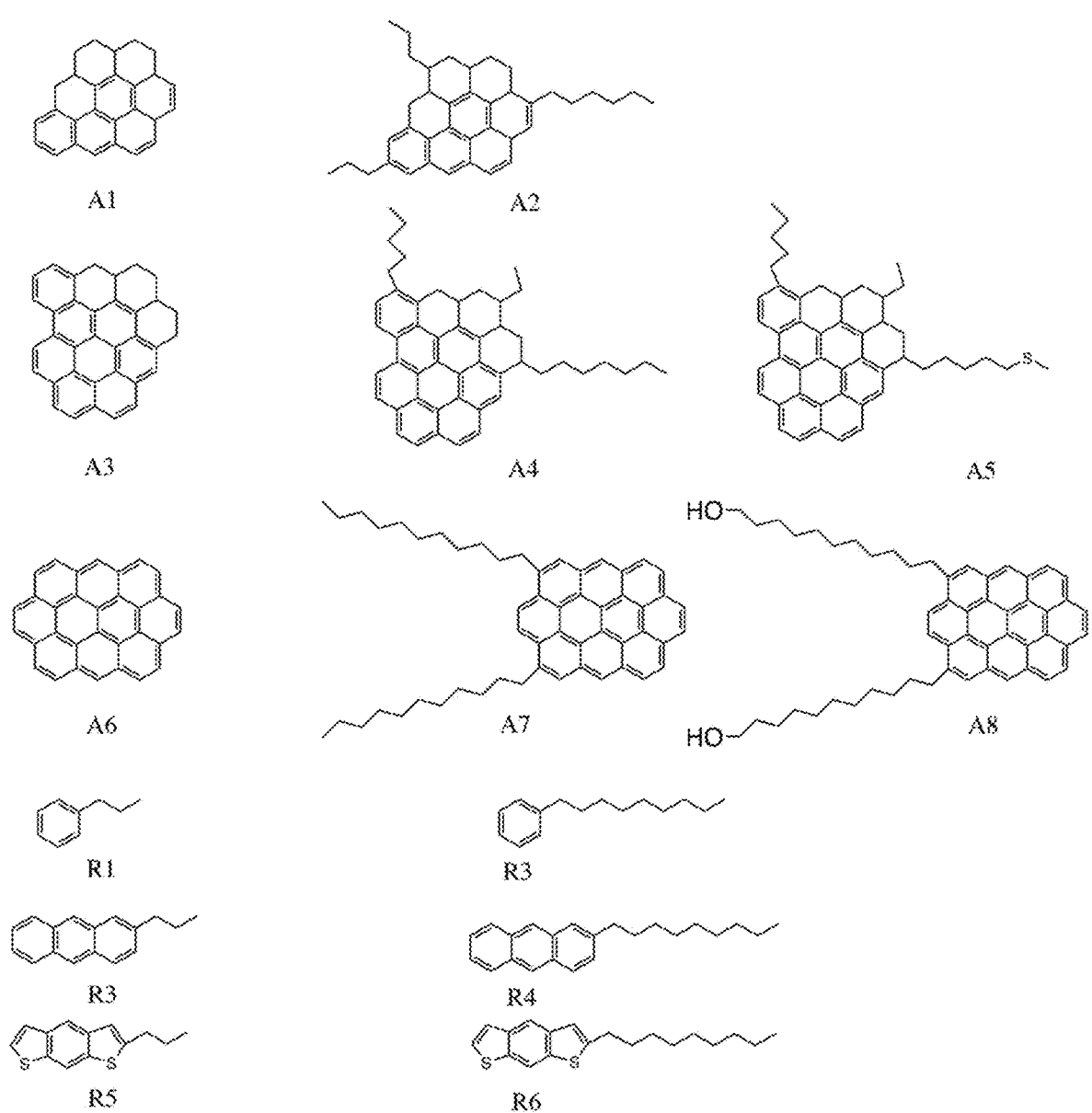
Figure 17A:
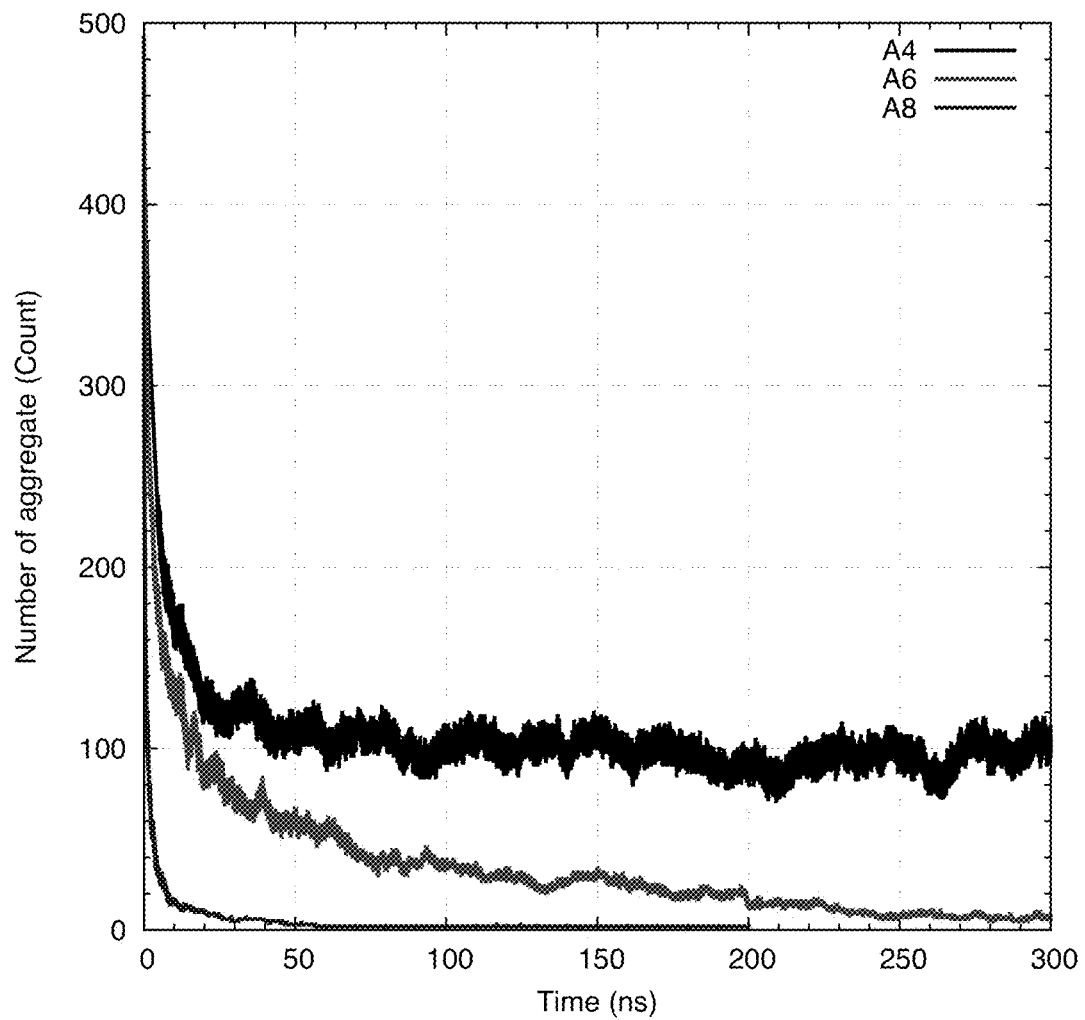
FIGS. 17A-17D show the aggregation of neat A4, A6 and A8 in large scale showing the contrast between mildly-aggregation A4 with readily-aggregating A6 and A8 in their capability of clustering and flocculation.
Figure 17B:
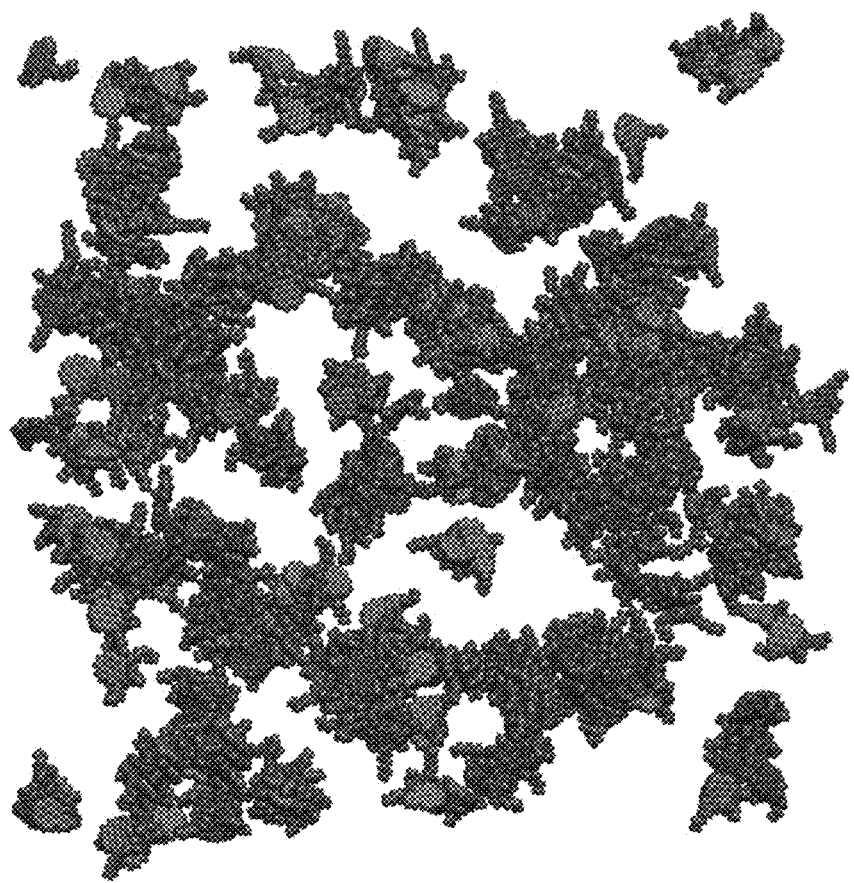
Figure 17C:
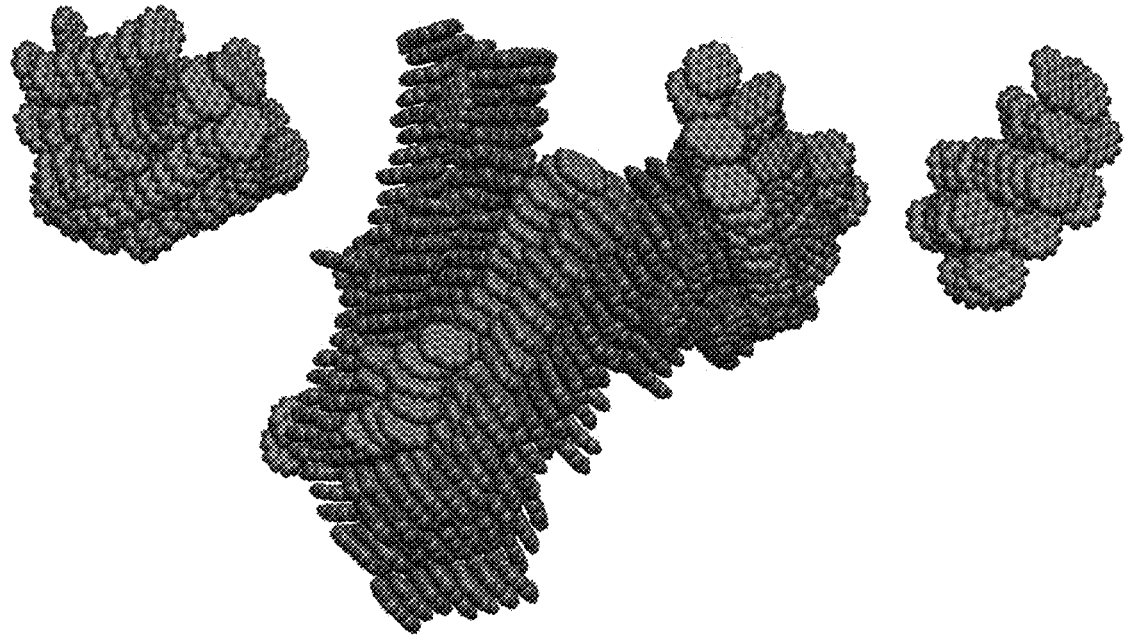
Figure 17D:
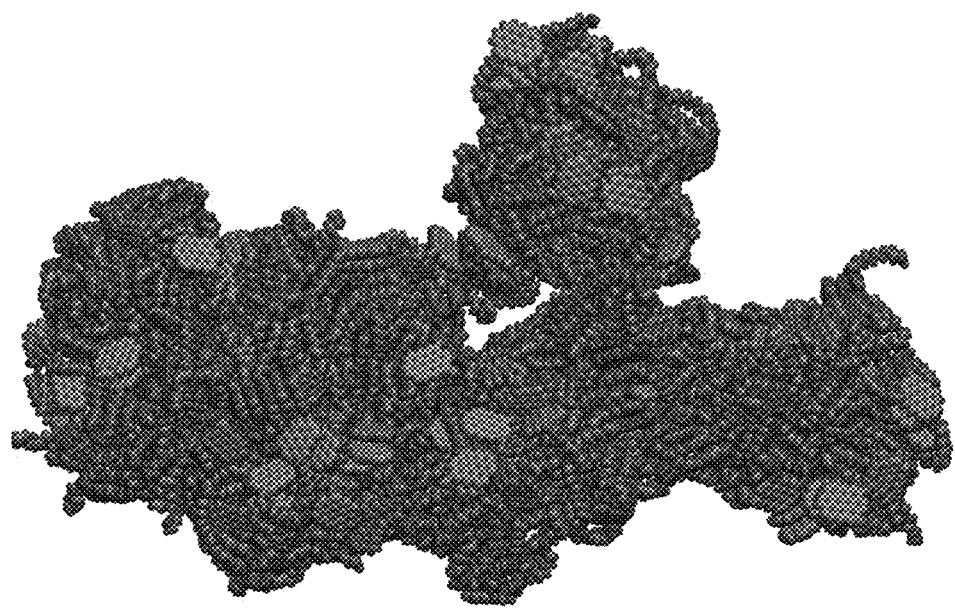

Previously, we learned that A1, and A2 depicted in FIG. 16 with not enough favorable molecular features such as large enough aromatic core and lack of heteroatom, do not form stable nanoaggregates. The rest of the set were categorized as either mildly-aggregating or readily-aggregating asphaltenes based on their aggregation propensity (AP) and isodesmic free energy of binding ($\Delta G_{iso}$) values. Furthermore, we showed that resins with small aromatic core such as R1, R2 shown in FIG. 16 did not deter the aggregation of model asphaltenes as effectively as other resins with three aromatic rings. Hence, we chose asphaltenes with higher aggregation propensities as well as one of the most deterring resins with three aromatic rings to study in larger scale. Larger scale simulations are suitable for study of clustering and post clustering, namely flocculation but they are computationally more expensive than nanoaggregation studies.

In this example, we hypothesized that a model resin with three aromatic rings could potentially deter the aggregation of asphaltenes in clustering and flocculation stage as well. Such deterring effect could alleviate the problem of asphaltene deposition. Due to the substantial interaction between resin and asphaltene molecules, interruption in nanoaggregation stage will extend to the microscopic positive outcome, namely stabilization of nanoaggregates. With this study we introduce the possibility of using the molecules with specific molecular features, which are native to crude oil, in solving the deposition problem rather than the use of costly and less effective mechanical and chemical methods. Furthermore, stabilized asphaltenes have chemical value and can be used in petrochemical plants in cracking processes in order to produce monomers and precursors of variety of polymers.

Identifying molecules with specific functional and structural features, which are capable of deterring aggregation is tremendously time consuming and burdensome for experimental techniques. The main reason is that synthesizing such complicated molecules can be time consuming and expensive. Also, purifying one specific asphaltene to study can be difficult due to variation in the structure of these molecules that are a class of molecules rather than a specific molecule. The use of molecular dynamics methods allows us to freely investigate such model molecules with atomistic detail and gain insight in dynamics of aggregation as well. Hence, revealing molecular interaction of asphaltenes and resins with atomistic resolution helps us to find better native inhibitors to prevent deposition of asphaltenes.

The petrochemical and petroleum industry can benefit from this method by cutting the expenses of cleaning and steadily producing carbon-rich materials that are used in almost every aspect of the modern life Computational Materials and Methods Materials and system setup. From the asphaltene-resin set shown in FIG. 16, some asphaltenes form nanoaggregates more intensely than the other ones due to the presence of certain molecular features such as large aromatic core and heteroatom(s). This asphaltene set originally designed for the study of asphaltene nanoaggregation and the effect of resins on the nanoaggregation. Among them, one mildly-aggregating (A4) and two readily-aggregating asphaltenes (A6, and A8) were investigated in this work for their clustering and flocculation behavior. All of the individual asphaltene and resin structures were built in GaussView V.5.0. Gaussian09 was used to geometry optimize all structures. The B3LYP exchange-correlation functional and basis set of 6-31+G(d) were used. We constructed six all-atom explicit solvent MD simulation systems from A4, A6 and A8 each of which contained 500 model asphaltene molecules. Three of the systems lacked the deterring resin R3 to study clustering and flocculation of the asphaltenes in their neat state and the other three contained R3 with the mass ratio of $R_w/A_w=5$ to study the effect of a highly interruptive resin with three aromatic ring on clustering and flocculation. The mass ratio of 5 is a typical mass ratio in a medium crude oil. We randomly dispersed all of the 500 asphaltene molecules in each simulation box. The concentration of the asphaltenes was 0.1M in each experiment. We picked n-heptane as the explicit solvent of choice as it best differentiates aggregation propensity of asphaltenes. In the examples above, we found that the size of the aromatic core and the presence of heteroatoms are the dominant molecular features in aggregation of asphaltenes. Also, the presence of heteroatoms and the size of aromatic cores are the dominant molecular feature of resin in interrupting the aggregation. These six systems test the effect of these molecular features in clustering and flocculation of asphaltenes.

Molecular dynamics (MD) is the method of choice to study processes that are either very difficult for experimental methods or currently impossible. MD provides atomistic resolution as well as insight to the dynamics of the process of interest. We performed all-atom explicit solvent simulation of all above six systems. Model asphaltenes and resin molecules were parameterized using OPLS-AA force field. OPLS-AA force field can reproduce experimental thermodynamics observables for organic and in particular aromatic molecules. We also showed above that OPLS-AA reproduced the experimental 2D-IR orientational parameters for a model asphaltene molecule called Violanthrone-79. Also, the RESP method was used for calculating partial charges on individual atoms Initial configuration of each system was energy minimized by using the steepest descent method to remove any existing high-energy structures. The time step for each simulation was 2 fs and we recorded the positions and energies every 2 ps. The computational resources in this work were of size 60 to 72 Intel's Xeon cores located on cluster computers from our group as well as XSEDE resources. All the molecular dynamics simulations were run using the Gromacs 5.0.4 software. To visualize the molecular systems, we used VMD 1.9 package. Also, we used Gnuplot and Matplotlib for plotting. For all systems, the simulations were performed in the isothermal-isobaric ensemble (NPT). Nose-Hoover and Parrinello-Rahman algorithms were used to keep average temperature and pressure constant at T=300 K and P=1 bar respectively. Cubic periodic boundary conditions were applied for all of the systems to simulate infinite bulk behavior. Long-range electrostatic interactions were treated by Particle Mesh Ewald (PME).

We simulated the aggregation of the neat A4 for 350 ns and neat A6 for 300 ns and A8 for 200 ns. We simulated aggregation of other three systems of A4, A6 and A8 in the presence of R3 for 200 ns. We also investigated clustering of 100 counts of A8 in an order of magnitude dilute (0.01M) system to ensure the clustering and subsequent flocculation also happens in lower concentrations of the asphaltene. However, it is noted that formation of single aggregate takes significantly longer time (600 ns). The system size is about 1.8 million atom which makes it substantially more expensive to study systems in very dilute concentration. Hence, we only studied asphaltenes aggregation behavior in higher concentration to cut on simulation times and distinguish their aggregation differences.

Analysis Methods

Measuring clustering and flocculation. To calculate the number of aggregates as well as aggregate sizes, we used a distance based clustering algorithm, which uses a cut-off distance to count an individual asphaltene as part of an aggregate. A range of cut-off distances were scanned to find the appropriate distance. We used cut-off distance of 0.37 nm between heavy atoms of the asphaltenes, which captures both face-to-face stacking as well as edge-to-edge stacking of asphaltenes. The result of clustering algorithm is consistent with the visual analysis of the trajectories.

Aggregation Propensity. We used the metric of aggregation propensity (AP). In this analysis, as denoted in equation below, we calculated the ratio of sum of solvent accessible surface area (SASA) values of the individual monomers to the SASA of entire aggregate as AP in each time step along the trajectory.

$$AP = \frac{\sum SASA_{monomer}}{SASA_{Aggregate}}$$

Radius of Gyration ($R_g$). In order to measure compactness and size of the large aggregates, we calculated the radius of gyration ($R_g$) of the aggregates. As denoted in the equation below, the radius of gyration is the root mean square of the distance between individual atoms of the aggregate and its center of mass. $R_g$ of the asphaltenes in the presence and absence of the resin gives us information about the overall dimension of the aggregate where we can measure if the aggregate has surpassed the nanoaggregation and clustering stages.

$$R_g = \left(\frac{\sum_i |r_i|^2 m_i}{\sum_i m_i}\right)^2$$

Rg was used in combination with aggregate number distribution and size to probe the physical dimensions as well as aggregate contents.

Results and Discussion

Clustering and flocculation of neat A4, A6, and A8. As shown in FIGS. 17A-17D, the aggregation of A4 started with dimerization and formation of nanoaggregates of size 5-7 as expected from our previous work. Further aggregation of A4 did not occur after nanoaggregation. However, aggregation never proceeded into clustering and flocculation after 350 ns of simulation as shown in Figure FIGS. 17A-17D. The average sizes was five molecules of A4, which is a typical size of a Yen-Mullins nanoagregate.

This behavior from a mildly-aggregating asphaltene suggests that even in the presence of large number of asphaltenes, a mildly-aggregating asphaltene cannot proceed to clustering and flocculation. So, based on the AP and $\Delta G_{iso}$ values we can predict the clustering and flocculation behavior of a mildly-aggregating asphaltene such as A4.

The mildly-aggregating A4 does not contain adequate number of favorable molecular features such as existence of heteroatom and a large aromatic core. Hence, with AP value of 1.9 and $\Delta G_{iso}$=-0.5, A4 does not reach a large enough aggregate size to form stable clusters. It appears that the minimum AP value and $\Delta G_{iso}$ required for clustering and flocculation stands above 1.9 and -0.5 consecutively. Additionally, this suggest that the AP value of greater than 1.9 and $\Delta G_{iso}$ value of greater than -0.5 is a required for flocculation.

Figure 18:
FIG. 18 shows all three states of asphaltene aggregates including nanoaggregates, clusters, and flocculates by 500 count of asphaltene-like A8 molecule in explicit n-heptane. n-heptane molecules are removed for clarity. The aromatic core of A8 is highlighted and individual π-π face-to-face stacks are formed in earlier stages to form nanoaggregates. Hydrogen bonds between hydroxyl groups are shown as lines.

Unlike the mildly-aggregating A4, the A6 and A8, which were classified as readily-aggregating asphaltenes by both AP and $\Delta G_{iso}$ metrics, proceeded nanoaggregation stage to form clusters of large size and flocculation followed afterwards. As shown in FIG. 18, the nanoaggregation of A8 followed by quick growth of aggregate size to cluster and slowly to flocculates. This image shows all the three stages of aggregation for A8 containing nanoaggregate, clusters and flocculate in 100 ns of the simulation. The aromatic cores of A8 is highlighted and the hydrogen bonds are shown with lines.

Figure 19A:
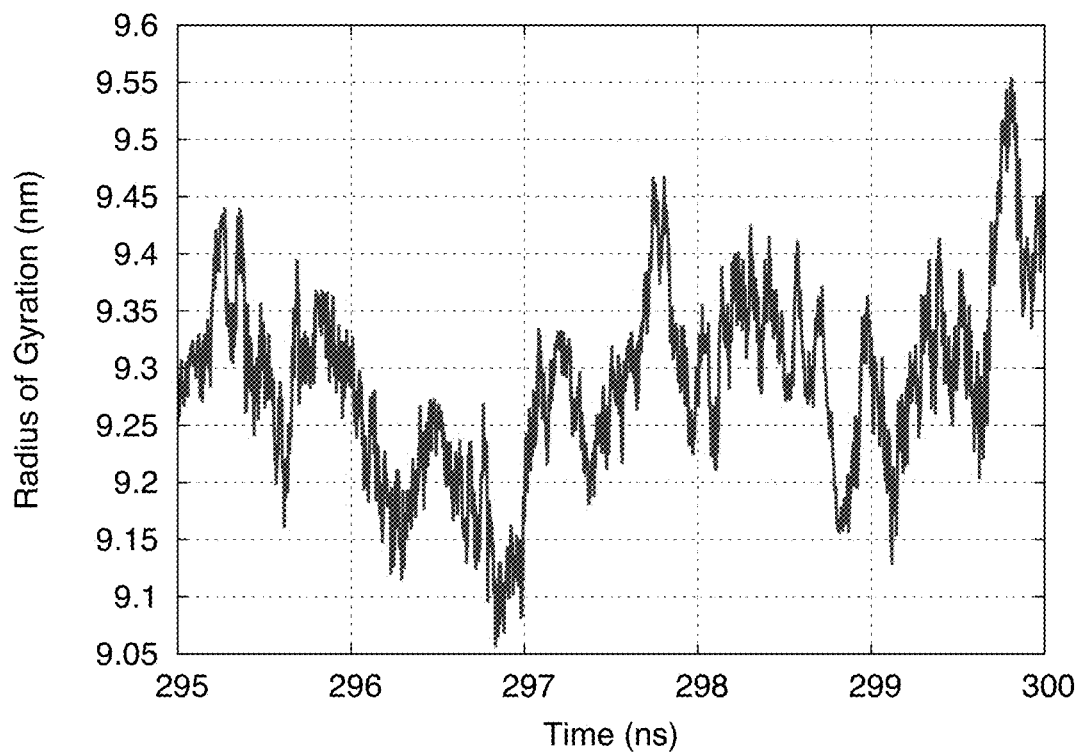
FIGS. 19A-19B show the radius of gyration of final aggregate fluctuates around 7.3 nm for A8 with a more globular shape aggregate and around 9.5 for A6 with a relatively rod shaped aggregate.
Figure 19B:
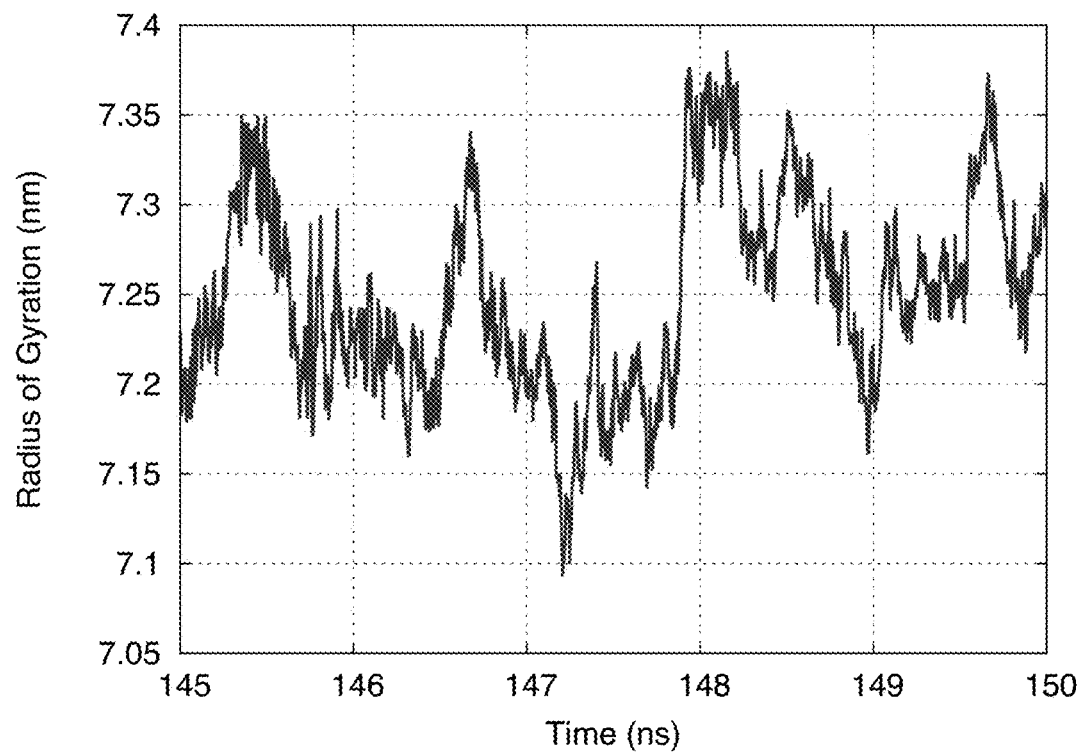
Figure 20A:
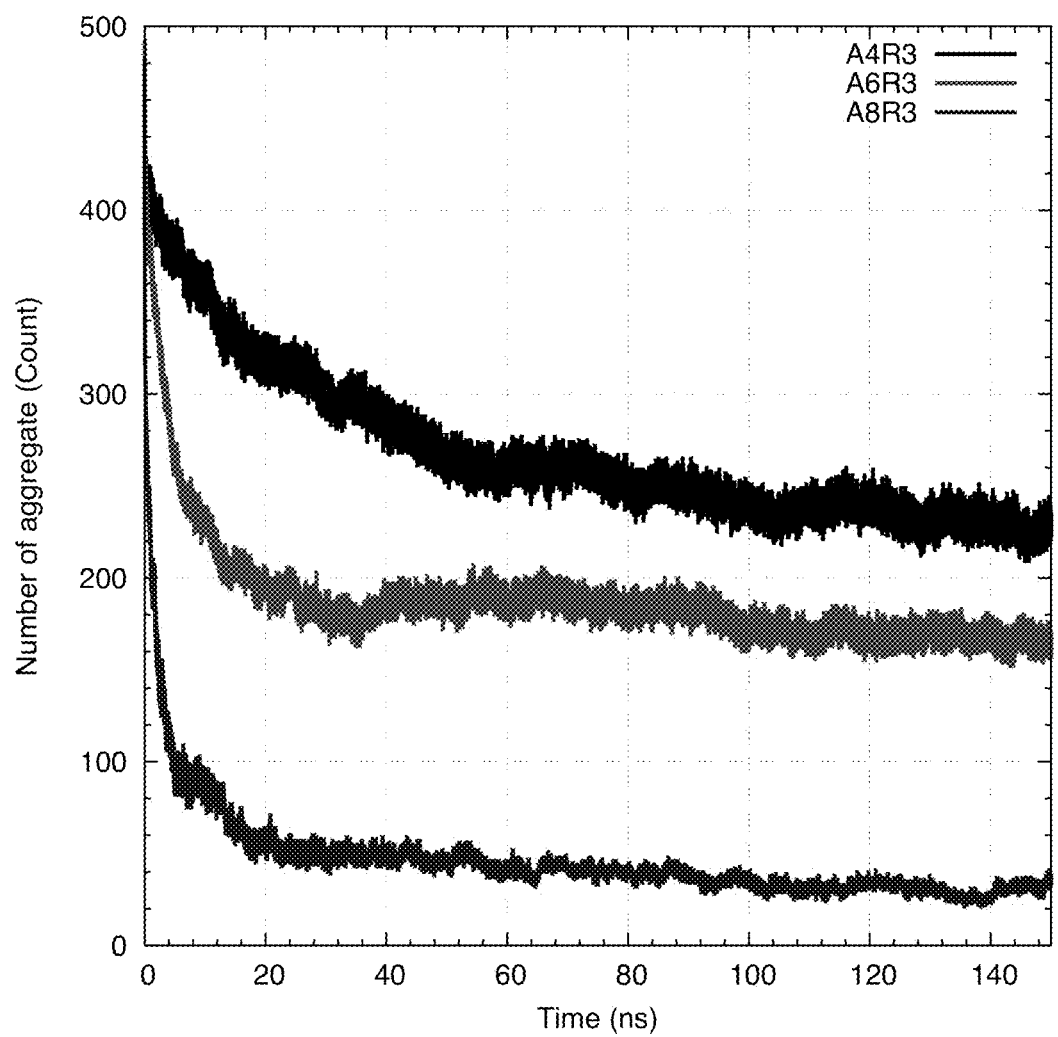
FIGS. 20A-20D illustrate the aggregation behavior of A4, A6 and A8 in large scale in the presence of the deterring resin R3.
Figure 20B:
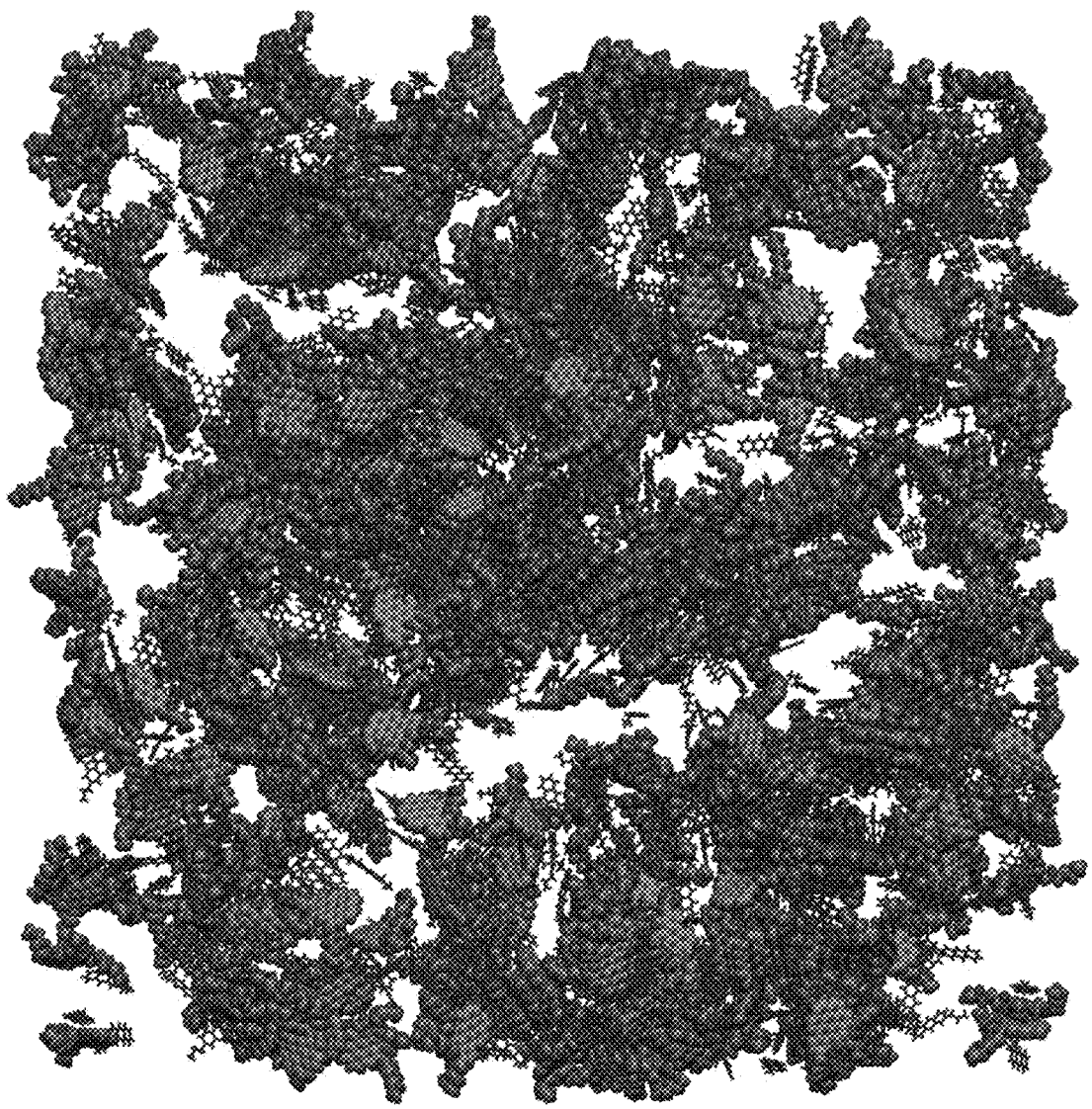
Figure 20C:
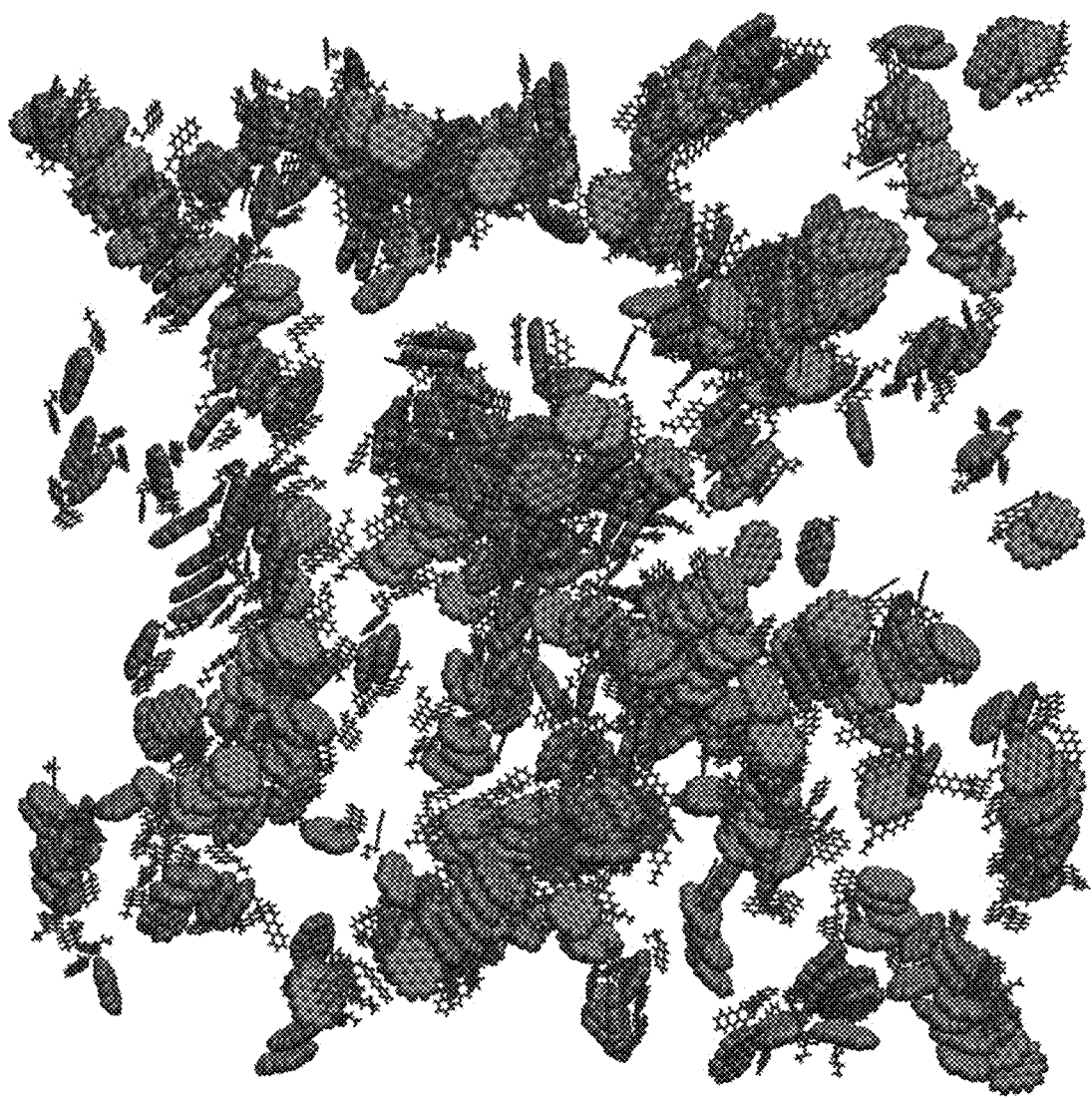
Figure 20D:
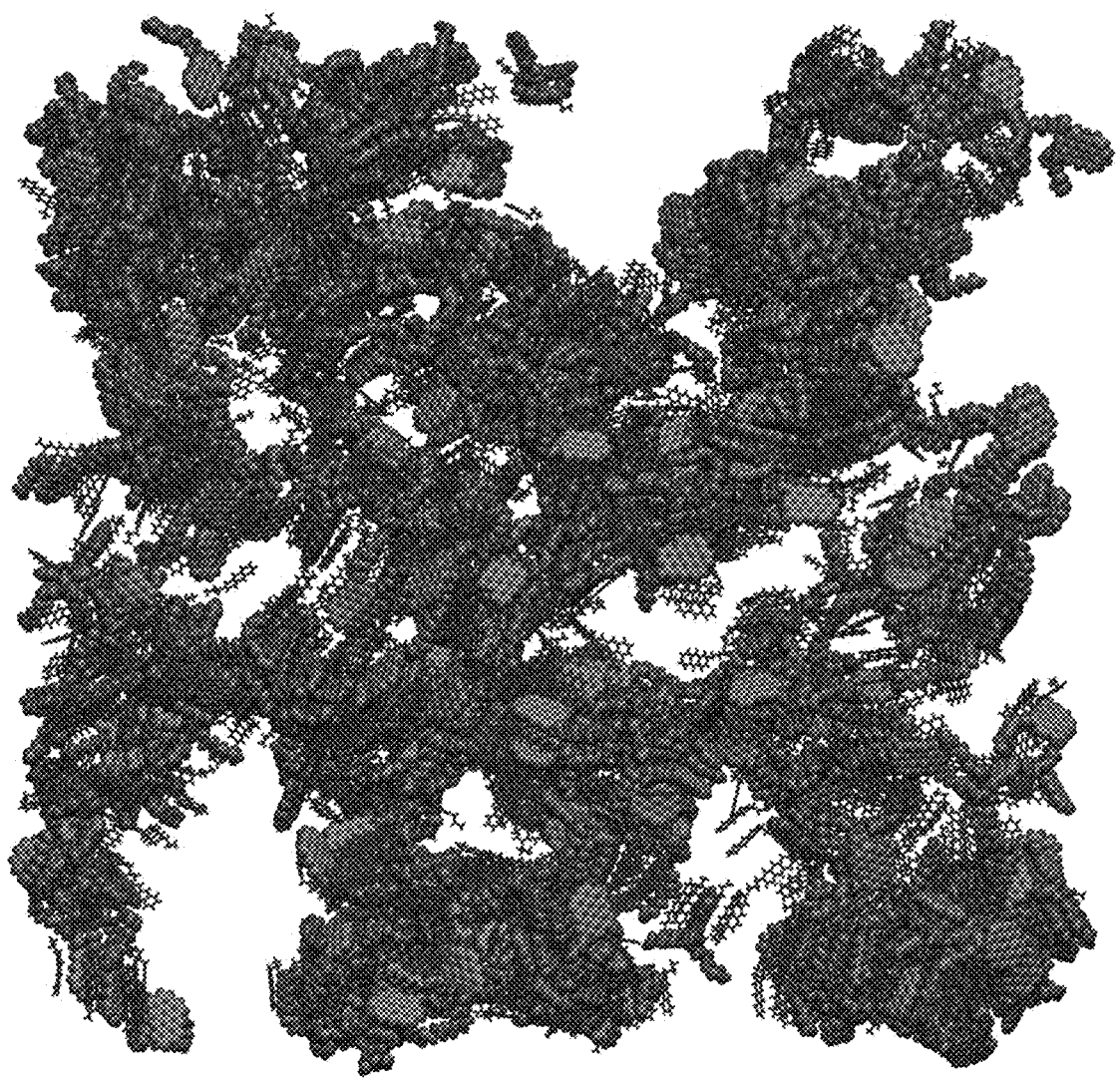

Quantitatively, shown in FIGS. 19A-19B, the radius of gyration of final aggregate fluctuates around 7.3 nm for A8 with a more globular shape aggregate and around 9.5 for A6 with a relatively rod shaped aggregate. These aggregate sizes are above the cluster size criteria from Yen-Mullins model and are indicative of flocculation, which is past clustering stage. However, there was a slight difference in their number of aggregate distribution due to the difference in their AP and $\Delta G_{iso}$ values putting A8 in a better position for having higher tendency to flocculate. The higher AP value of A8, and more negative $\Delta G_{iso}$ resulted in larger cluster size as well as reaching the flocculation stage in earlier time scale at the same condition.

The readily-aggregating A6 has a large enough aromatic core with 10 benzene fused rings. However, even though A6 lacks favorable heteroatom(s), it forms the large clusters that proceed further aggregation and hence flocculation happens. This suggests that the existence of heteroatom is not absolutely necessary for clustering and flocculation. A6 with the AP=2.0 and $\Delta G_{iso}$=-2.2 suggest that the minimum value for the successful clustering and flocculation is near these values. Similarly, A8 with both large aromatic core and the presence of a heteroatom proceeded to form large clusters and flocculates. The AP value of 2.8 and $\Delta G_{iso}$ of -7.2 is above the criteria for clustering and flocculation. Given these values are calculated using the diverse molecular features of asphaltenes, we can use molecular features of a new asphaltene molecule to predict its clustering and flocculation behavior as well.

Figure 21A:
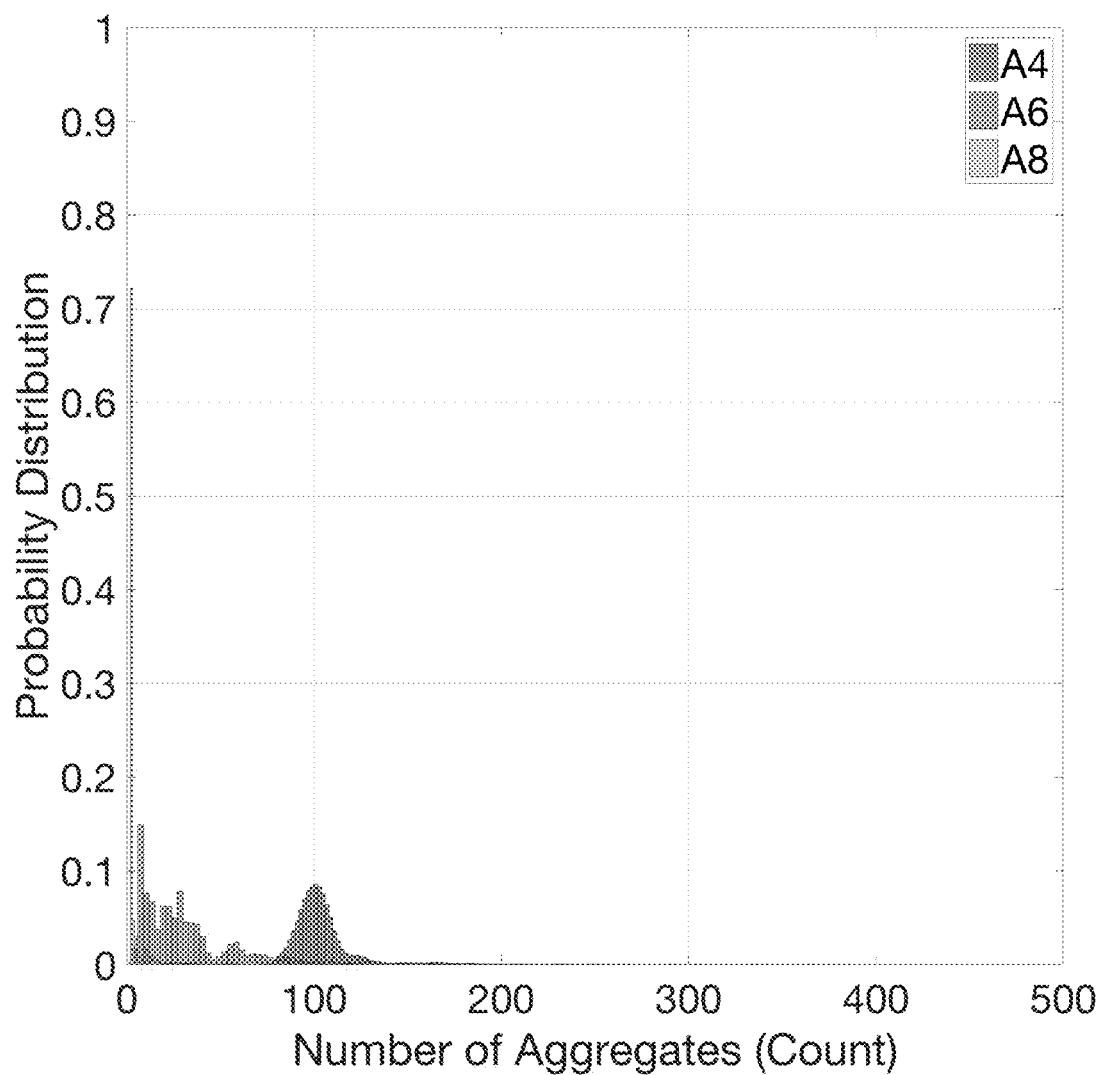
FIGS. 21A-21B show the probability distribution of number of aggregates for A4, A6, and A8 in the absence of resin and in the presence of the resin.
Figure 21B:
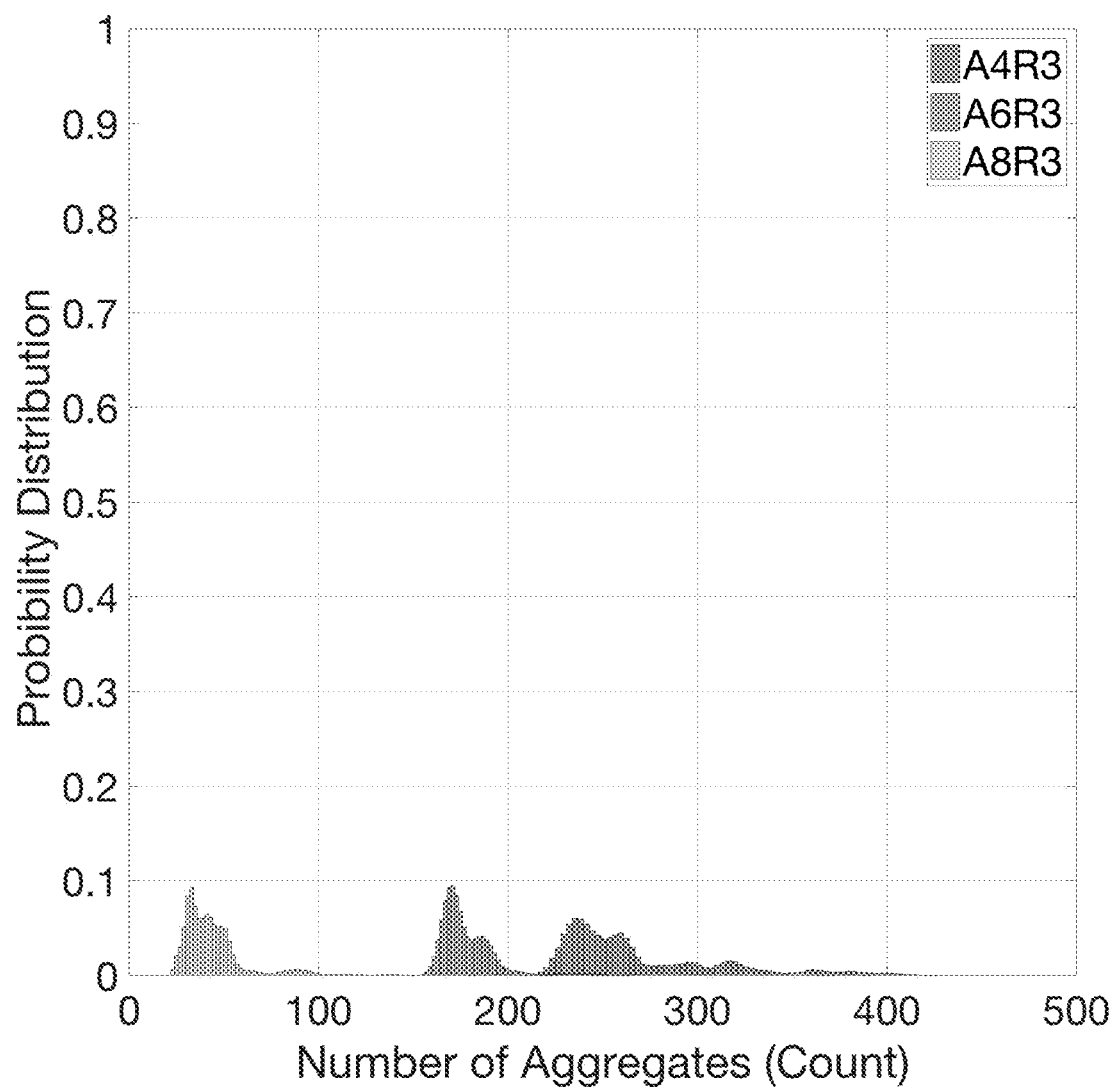

The interrupting effect of R3 in the clustering of A4, A6, and A8. Conceivably, introducing R3, which is one of the most deterring resins among our model resin set, did not promote further aggregation of the mildly-aggregating A4 as shown in FIGS. 20A-20D. However, it further disrupted the aggregation of the A4 by shifting the number of aggregate distribution to right where there are more nanoaggregates of smaller size compared to its neat state. See FIGS. 21A-21B.

The size of aggregates decreased drastically in the presence of R3 and dropped from large nanoaggregates to smaller size nanoaggregates and even dimers and trimers. As shown in FIGS. 20A-20D, the average size of the nanoaggregates dropped from five asphaltenes per nanoaggregate to 2.5 asphaltenes per nanoaggregate. As shown in FIG. 20A-20D, in the presence of the deterring resin, A6 did not further aggregate to form large clusters and hence flocculation did not occur contrary to its neat state where both of these behaviors were observed.

CONCLUSION

In this example, we used all-atom molecular dynamics to investigate the possibility of deterring asphaltene aggregation in large scales by resin, as asphaltene deposition is a huge economic burden on oil industry. We previously showed that resins with three aromatic ring and resin with sulfur heteroatom as their effective molecular features can deter formation of stable asphaltene nanoaggregates.

Here, we showed that the deterring capability of resin extends beyond nanoaggregation stage and the three step-wise aggregation of asphaltenes is interrupted in the presence of R3 which contains three aromatic rings. Hence, a resin with a large enough aromatic core can interrupt further aggregation of asphaltene nanoaggregates and prevent them from formation of stable clusters and can stop macroscopic flocculation of the asphaltene. The results of this work give predictive power to the AP and $\Delta G_{iso}$ values beyond nanoaggregation stage. We predict that the resin R5 with two sulfur heteroatoms, which ranked one of the highly effective deterring resins in nanoaggregation study, is capable of stopping clustering and flocculation as well.

One could use these methods to screen and separate similar resins from natural resources like medium and heavy crude with high content of resins with three aromatic rings or with sulfur heteroatom(s) inside the aromatic rings to be used for stopping clustering and flocculation and hence deposition of asphaltenes in lighter crude oils. By further studying the impact of concentration of resin, it will be possible to find a quantitative measure on minimum required concentration to have interrupting effect on the clustering and flocculation of the asphaltenes.

The methods of the appended claims are not limited in scope by the specific methods described herein, which are intended as illustrations of a few aspects of the claims. Any methods that are functionally equivalent are intended to fall within the scope of the claims. Various modifications of the methods in addition to those shown and described herein are intended to fall within the scope of the appended claims. Further, while only certain representative compounds, compositions, and method steps disclosed herein are specifically described, other combinations of the compounds, compositions, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method of selecting an aggregation inhibitor for an asphaltene, the method comprising:

defining a classical force field describing an internal geometry and a charge distribution of the asphaltene;

calculating an equilibrium aggregate size distribution of the asphaltene at thermal equilibrium using molecular dynamics simulations;

calculating an equilibrium aggregate size distribution of the asphaltene in the presence of a potential aggregation inhibitor at thermal equilibrium using molecular dynamics simulations;

wherein a decrease in the equilibrium aggregate size in the presence of the potential aggregation inhibitor indicates that the potential aggregation inhibitor is a suitable aggregation inhibitor for the asphaltene.

2. The method of claim 1, wherein the aggregation inhibitor comprises a natural resin, a synthetic resin, or a combination thereof.

3. The method of claim 1, wherein the aggregation inhibitor comprises a petroleum resin.

4. The method of claim 1, wherein a decrease of at least 10%, at least 25%, or at least 50% in the equilibrium aggregate size in the presence of the potential aggregation inhibitor indicates that the potential aggregation inhibitor is a suitable aggregation inhibitor for the asphaltene.

5. The method of claim 1, wherein when the decrease in the equilibrium aggregate size in the presence of the potential aggregation inhibitor is at least 10%, at least 25%, or at least 50%, the potential aggregation inhibitor is selected as a suitable aggregation inhibitor for the asphaltene.

6. The method of claim 1, wherein the method further comprises:

determining an increase or a decrease in the equilibrium aggregate size in the presence of each of a plurality of potential asphaltene aggregation inhibitors; and selecting the aggregation inhibitor which exhibits the largest decrease in the equilibrium aggregate size as a suitable aggregation inhibitor for the asphaltene.

7. A method of inhibiting asphaltene aggregation from a hydrocarbon mixture comprising an asphaltene, the method comprising selecting a suitable aggregation inhibitor for the asphaltene using the method of claim 1, and adding the aggregation inhibitor to the hydrocarbon mixture.

8. The method of claim 7, wherein the method further comprises assaying the hydrocarbon mixture to structurally identify the asphaltene present in the hydrocarbon mixture.

9. The method of claim 7, wherein the aggregation inhibitor comprises a natural resin, and wherein adding the aggregation inhibitor to the hydrocarbon mixture comprises adding a second hydrocarbon mixture comprising the natural resin to the hydrocarbon mixture comprising the asphaltene.

10. The method of claim 7, wherein inhibiting asphaltene aggregation comprises preventing asphaltene aggregation.

11. The method of claim 10, wherein the hydrocarbon mixture is in contact with equipment associated with an oil and gas operation, and wherein adding the aggregation inhibitor to the hydrocarbon mixture decreases the rate of aggregate formation on the equipment associated with an oil and gas operation.

12. The method of claim 11, wherein the equipment associated with an oil and gas operation comprises surface processing equipment, downhole equipment, pipelines and associated equipment, pumps, or other equipment which contacts hydrocarbons during the course of an oil and gas operation.

13. The method of claim 7, wherein inhibiting asphaltene aggregation comprises solubilizing an aggregated asphaltene.

14. The method of claim 13, wherein the aggregated asphaltene is present on equipment associated with an oil and gas operation, and wherein adding the aggregation inhibitor to the hydrocarbon mixture solubilizes the aggregated asphaltene on the equipment associated with an oil and gas operation.

15. The method of claim 13, wherein the aggregated asphaltene is present on a natural solid material and wherein adding the aggregation inhibitor to the hydrocarbon mixture solubilizes the aggregated asphaltene present on the natural solid material.

16. The method of claim 15, wherein the natural solid material comprises tar sands, oil sands, or a combination thereof.

17. A method of displacing an asphaltene aggregate in contact with a solid material, the method comprising:
   selecting a suitable aggregation inhibitor for the asphaltene using the method of claim 1;
   contacting the asphaltene aggregate with the aggregation inhibitor, wherein the asphaltene aggregate is in contact with the solid material; and
   allowing the asphaltene aggregate to separate from the solid material, thereby displacing the asphaltene aggregate in contact with the solid material.

18. The method of claim 17, wherein the method is an enhanced oil recovery (EOR) operation.

19. The method of claim 17, wherein the solid material comprises equipment associated with an oil and gas operation.

20. The method of claim 17, wherein the solid material comprises oil sand or tar sands.

21. The method of claim 20, wherein the method comprises extracting hydrocarbons from the oil sand or tar sands.

22. A method for identifying a synthetic aggregation inhibitor for an asphaltene, the method comprising,
   defining a chemical structure of a proposed synthetic aggregation inhibitor;
   defining a classical force field describing an internal geometry and a charge distribution of the asphaltene;
   calculating an equilibrium aggregate size distribution of the asphaltene at thermal equilibrium using molecular dynamics simulations;
   calculating an equilibrium aggregate size distribution of the asphaltene in the presence of the proposed synthetic aggregation inhibitor at thermal equilibrium using molecular dynamics simulations; and
   determining an increase or a decrease in the equilibrium aggregate size in the presence of the proposed synthetic aggregation inhibitor;
   wherein a decrease in the equilibrium aggregate size in the presence of the proposed synthetic aggregation inhibitors indicates that the proposed aggregation inhibitor is a suitable synthetic aggregation inhibitor for the asphaltene.

* * * * *